US011674234B1

(12) United States Patent
Klavetter et al.

(10) Patent No.: US 11,674,234 B1
(45) Date of Patent: Jun. 13, 2023

(54) ELECTRODEPOSITED PLATINUM-GOLD ALLOY

(71) Applicant: National Technology & Engineering Solutions of Sandia, LLC, Albuquerque, NM (US)

(72) Inventors: Kyle Chris Klavetter, Albuquerque, NM (US); Jonathan Joseph Coleman, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 107 days.

(21) Appl. No.: 17/466,684

(22) Filed: Sep. 3, 2021

Related U.S. Application Data

(60) Provisional application No. 63/085,243, filed on Sep. 30, 2020.

(51) Int. Cl.
*B32B 15/01* (2006.01)
*C22C 5/04* (2006.01)
(Continued)

(52) U.S. Cl.
CPC .............. *C25D 3/50* (2013.01); *B32B 15/018* (2013.01); *C22C 5/04* (2013.01); *C23C 30/00* (2013.01); *C23C 30/005* (2013.01); *C25D 3/567* (2013.01); *C25D 5/615* (2020.08); *C25D 5/617* (2020.08); *C25D 5/619* (2020.08); *C25D 17/12* (2013.01); *Y10S 977/70* (2013.01); *Y10S 977/72* (2013.01); *Y10S 977/755* (2013.01); *Y10S 977/81* (2013.01); *Y10T 428/12868* (2015.01); *Y10T 428/12875* (2015.01); *Y10T 428/12993* (2015.01); *Y10T 428/2495* (2015.01);
(Continued)

(58) Field of Classification Search
CPC ........ C25D 17/12; C25D 5/615; C25D 5/619; C25D 5/617; C25D 3/50; C25D 3/567; B32B 15/013; C23C 30/00; C23C 30/005; C22C 5/04; Y10T 428/12875; Y10T 428/12993; Y10T 428/12868; Y10T 428/2495; Y10T 428/24967; Y10T 428/265; Y10T 428/26; Y10S 977/70; Y10S 977/72; Y10S 977/755; Y10S 977/81
See application file for complete search history.

(56) References Cited

U.S. PATENT DOCUMENTS 3,923,612 A    12/1975    Wiesner
9,387,225 B2 *   7/2016    Dorfman ................. A61K 9/14
10,763,000 B1   9/2020    Argibay et al.

OTHER PUBLICATIONS

Heckman, N. M. et al., "Rethinking Scaling Laws in the High-Cycle Fatigue Response of Nanostructured and Coarse-Grained Metals," International Journal of Fatigue, 2020, vol. 134, 105472, 7 pages.
(Continued)

*Primary Examiner* — Michael E. La Villa
(74) *Attorney, Agent, or Firm* — Martin I. Finston; Mark A. Dodd

(57) ABSTRACT

A coating made of platinum-gold alloy is provided, together with a method of its preparation by electrodeposition. The alloy is composed of more than 50 atomic percent platinum. The microstructure of the alloy consists of generally ellipsoidal grains. More than half of the grains have a major axis of 10 nm or less.

20 Claims, 16 Drawing Sheets

(51) Int. Cl.
  *C23C 30/00* (2006.01)
  *C25D 3/50* (2006.01)
  *C25D 3/56* (2006.01)
  *C25D 17/12* (2006.01)
  *C25D 5/00* (2006.01)
(52) U.S. Cl.
  CPC ...... *Y10T 428/24967* (2015.01); *Y10T 428/26* (2015.01); *Y10T 428/265* (2015.01)

(56) References Cited

OTHER PUBLICATIONS

Barr, C. M. et al., "The Role of Grain Boundary Character in Solute Segregation and Thermal Stability of Nanocrystalline Pt—Au," Nanoscale, 2021, vol. 13, pp. 3552-3563, (January).

Mathaudhu, S. N. and Boyce, B. L., "Thermal Stability: The Next Frontier for Nanocrystalline Materials," JOM, 2015, vol. 67, pp. 2785-2787.

Chookajorn, T. et al., "Design of Stable Nanocrystalline Alloys," Science, 2012, vol. 337, pp. 951-954, (August).

Murdoch, H. A. and Schuh, C. A., "Estimation of Grain Boundary Segregation Enthalpy and its Role in Stable Nanocrystalline Alloy Design," Journal of Materials Research, 2013, vol. 28, pp. 2154-2163, (August).

Dini, J. W., "Properties of Coatings: Comparisons of Electroplated, Physical Vapor Deposited, Chemical Vapor Deposited, and Plasma Sprayed Coatings," Materials and Manufacturing Processes, 1997, vol. 12, pp. 437-472.

Moniri, S. et al., "Pitfalls and Best Practices in Measurements of the Electrochemical Surface Area of Platinum-Based Nanostructured Electro-Catalysts," Journal of Catalysis, 2017, vol. 345, pp. 1-10.

Curry, J. F et al., "Achieving Ultralow Wear with Stable Nanocrystalline Metals," Advanced Materials, 2018, vol. 30, 1802026, 7 pages.

Heckman, N. M. et al., "New Nanoscale Toughening Mechanisms Mitigate Embrittlement in Binary Nanocrystalline Alloys," Nanoscale, 2018, vol. 10, pp. 21231-21243.

Lu, P. et al., "On the Thermal Stability and Grain Boundary Segregation in Nanocrystalline PtAu Alloys," Materialia, 2019, 100298, 9 pages. (doi.org/10.1016/j.mtla.2019.100298), (March).

O'Brien, C. J. et al., "Grain Boundary Phase Transformations in PtAu and Relevance to Thermal Stabilization of Bulk Nanocrystalline Metals," Journal of Materials Sciences, 2018, vol. 53, pp. 2911-2927. (DOI 10.1007/s10853-017-1706-1).

Lim, J-E. et al., "Oxygen Reduction Reaction on Electrodeposited PtAu Alloy Catalysts in the Presence of Phosphoric Acid," Applied Catalysis B: Environmental, 2015, vol. 165, pp. 495-502.

Klavetter, K. C. et al., "Engineered Reliability via Intrinsic Thermomechanical Stability of an Electrodeposited Au—Pt Nanocrystalline Alloy," 2019, SAND2019-14375, Sandia National Laboratories, Albuquerque, NM, 26 pages.

Argibay, N. et al., "Nanocrystalline Pt—Au MEMS Electrical Switches," 2017, SAND2017-11198C, Sandia National Laboratories, Albuquerque, NM, 49 pages.

Curry, J. F. et al., "Achieving Ultra-Low Wear with Stable Nanocrystalline Alloys," 2019, SAND2019-4357c, Sandia National Laboratories, Albuquerque, NM, 1 page.

Argibay, N. et al., "Ultralow Wear of Stable Nanocrystalline Metals," 2017, SAND2017-11319C, Sandia National Laboratories, Albuquerque, NM, 22 pages.

Foiles, S. M. et al., "Alloy Stabilization of Nanocrystalline Grain Structures: Case Study of Pt—Au," 2017, SAND2017-2067C, Sandia National Laboratories, Albuquerque, NM, 18 pages, (March).

Argibay, N. et al., "Is Intrinsic Nanocrystalline Stability Practically Achievable? Insights from Investigations with Pt—Au Alloys," 2017, SAND2017-11199C, Sandia National Laboratories, Albuquerque, NM. 32 pages.

Clark, B. G. et al., "Nanostructure Stability and Wear of Binary Nanocrystalline Alloys," 2016, SAND2016-6443C, Sandia National Laboratories, Albuquerque, NM, 59 pages, (July).

Argibay, N. et al., "Is Intrinsic Nanocrystalline Stability Practically Achievable? Insights from Investigations with Pt—Au Alloys," 2016, 2016 Annual Meeting of AVS—Tennessee, SAND2016-4212C, Sandia National Laboratories, Albuquerque, NM, 1 page.

Goeke, R. S. et al., "High Thermal Stability Nanocrystalline Gold, Part I," 2015, AVS 61st International Symposium & Exhibition, SAND2015-1199C, Sandia National Laboratories, Albuquerque, NM, 24 pages.

Brumbach, M. et al., "Analysis of Gold Coatings for Electrical Contacts," 2015, SAND2015-2152C, Sandia National Laboratories, Albuquerque, NM, 1 page.

Curry, J. F. et al., "Achieving Ultra-Low Wear with Stable Nanocrystalline Metals," 2018, SAND2018-3274J, Sandia National Laboratories, Albuquerque, NM, 23 pages.

Argibay, N. et al., "Exploring the Mechanical and Thermal Stability of Nanocrystalline Metal Composite and Alloy Thin Films," SAND2015-3366C, Sandia National Laboratories, Albuquerque, NM, 54 pages.

Argibay, N. et al., "High Thermal Stability Nanocrystalline Gold Films—Part II," 2014, At the 61st AVS International Symposium and Exhibition, SAND2014-19612C, Sandia National Laboratories, Albuquerque, NM, 31 pages.

Argibay, N. et al., "Atomic Origins of Friction Reduction in Nanocrystalline Metal Alloys and Composites," 2013, SAND2013-3490C, Sandia National Laboratories, Albuquerque, NM, 26 pages.

* cited by examiner

ELECTRODEPOSITED PLATINUM-GOLD ALLOY

CROSS-REFERENCE TO RELATED APPLICATION

This application claims priority to U.S. Provisional Application Ser. No. 63/085,243, filed Sep. 30, 2020 under the title, "ELECTRODEPOSITED PLATINUM-GOLD ALLOY," the entirety of which is hereby incorporated herein by reference.

STATEMENT OF GOVERNMENT RIGHTS

This invention was developed under Contract No. DE-NA0003525 awarded by the United States Department of Energy/National Nuclear Security Administration. The Government has certain rights in this invention.

FIELD OF THE INVENTION

This invention relates to metal alloy coatings, and more particularly to electrodeposited films of alloys of noble metals.

ART BACKGROUND

It is well known that the material strength of a nanostructured material is increased through grain-boundary strengthening. In this regard, enthalpy calculations have been useful in predicting the stability of nanocrystalline materials. Examples are found in Chookajorn et al. "Design of Stable Nanocrystalline Alloys." *Science.* 2012 and in Murdoch et al. "Estimation of Grain Boundary Segregation Enthalpy and Its Role in Stable Nanocrystalline Alloy Design." *J. Mater. Res.* 2013. Calculations published in those papers were foundational to defining the design of grain-boundary-segregated, stable nanocrystalline alloys. From those works, about 2500 alloys, including platinum-gold, were identified as potential thermodynamically stable, nanocrystalline materials.

It would be highly advantageous if materials could be confidently engineered for the mechanical properties of initial or maintained strength, ductility, wear resistance, hardness, and fracture resistance, and especially for the maintenance of these properties under thermal stress or mechanical loads. Based on current theories, however, it still cannot be predicted with confidence that the thermodynamic stability of an engineered nanostructured alloy of a given composition and structure, or of a nanostructured alloy with intentionally designed grain-boundary solute segregation, will result in a material with such desirable properties. Publications of interest in this regard include Nathan M. Heckman et al. "Rethinking scaling laws in the high-cycle fatigue response of nanostructured and coarse-grained metals." *Int. J. of Fatigue* 134 (2020) 105472, Christopher M. Barr et al. "The role of grain boundary character in solute segregation and thermal stability of nanocrystalline Pt—Au." *Nanoscale* 13 (2021) 3552-3563, and Suveen Mathaudhu et al., "Thermal Stability: The Next Frontier for Nanocrystalline Materials." *JOM* 67 (2015) 2785-2787.

U.S. Pat. No. 3,923,612 discloses an alkaline electrolyte plating chemistry for the electroplating of a gold-platinum alloy. The resulting products are described as electrically conductive films or coatings characterized by greater hardness, wear resistance, corrosion resistance and lower porosity.

U.S. Pat. No. 10,763,000 discloses an ultra-low wear alloy of platinum and gold having high thermomechanical nanocrystalline stability. In examples, thin films of the alloy are prepared by physical vapor deposition.

There is still a need for further platinum-gold alloys having favorable properties of low friction and high corrosion resistance, among others. In particular, there is a need for alloys that have such properties and that can be formed as electrodeposited films.

SUMMARY OF THE INVENTION

We have developed a platinum-gold alloy having many useful properties. Our alloy is deposited from an electroplating chemistry that is acidic, unlike the alkaline chemistry disclosed in U.S. Pat. No. 3,923,612.

Our new alloy is particularly suited for applications requiring the properties of low wear, low coefficient of friction, low corrosion rate, and high electrical conductivity.

The alloy is formed by electrodeposition from an acidic aqueous electroplating bath containing metal precursor salts for gold and platinum. Favorable types of precursor salts and favorable concentration ranges have been identified. We have also determined effective types and concentrations of supporting electrolyte and surfactant, and effective ranges of pH and temperature.

Accordingly, the invention in one aspect relates to a coating made of platinum-gold alloy. The alloy composition includes more than 50 atomic percent platinum. The microstructure of the alloy is characterized by generally ellipsoidal grains. More than half of the grains have a major axis of 10 nm or less. In embodiments, more than half of the grains are composed, effectively, of a uniform PtAu alloy phase.

In embodiments, the alloy is coated onto a substrate by electrodeposition, exemplarily from an acidic electroplating bath. In embodiments, the film is 10 nm to 100 μm thick, and in more specific embodiments, it is 5 μm to 100 μm thick.

In embodiments, the microstructure of the alloy encompasses a plurality of nanopores. In embodiments, more than half of the nanopores have maximum dimensions in the range 1-2.5 nm. The nanopores may, for example, have a volume fraction in the film falling in the range 1% to 10%.

In embodiments, the alloy has a gold content in the range 5-20 atomic percent. In some embodiments, the film has a gold-to-platinum atomic ratio that varies with depth within the film. For example, the gold-to-platinum atomic ratio may vary with depth within the film such that a compositional gradient is defined within the film.

In some embodiments, the alloy is a binary alloy of platinum and gold. In other embodiments, the alloy contains at most 10 atomic percent of alloyed metallic elements other than platinum and gold. In more specific embodiments, the alloy contains at most 5 atomic percent of alloyed metallic elements other than platinum and gold.

In embodiments, the film exhibits less than $3 \times 10^{-7}$ mm3/N-m of wear in a reciprocating linear ball-on-flat friction and wear test. In embodiments, the film exhibits a coefficient of friction of about 0.2 or less in a reciprocating linear ball-on-flat friction and wear test.

In another aspect, the invention relates to a film of amorphous platinum-gold alloy coated onto a substrate, wherein the alloy composition includes more than 50 atomic percent platinum.

In still another aspect, the invention relates to a film of platinum-gold alloy coated onto a substrate, in which the alloy composition includes more than 50 atomic percent platinum and the alloy has a microstructure composed of generally ellipsoidal grains, more than half of which have a major axis of 3 nm or less.

DETAILED DESCRIPTION

Figure 1A:
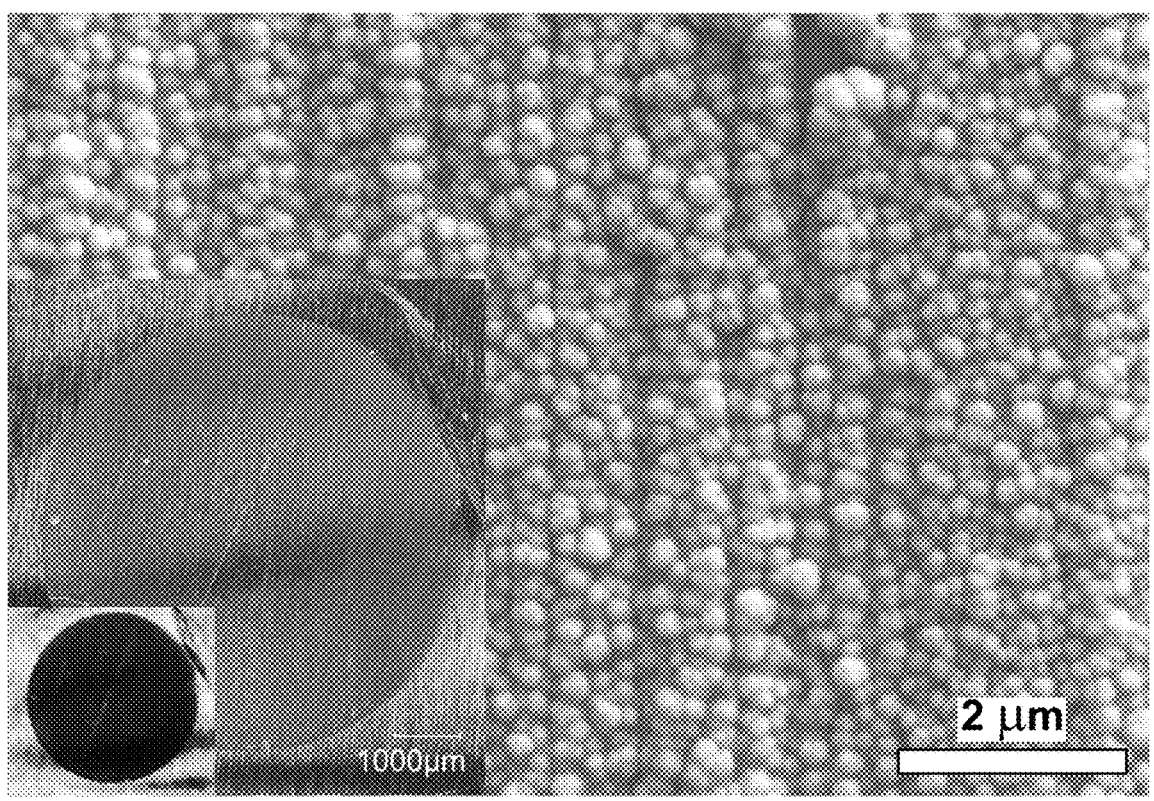
FIGS. 1A-1D are a sequence of micrographs of electrodeposited films, illustrating a pathway to semi-optimized pulse plating in NaCl electrolyte with surfactant, according to principles described here.
Figure 1B:
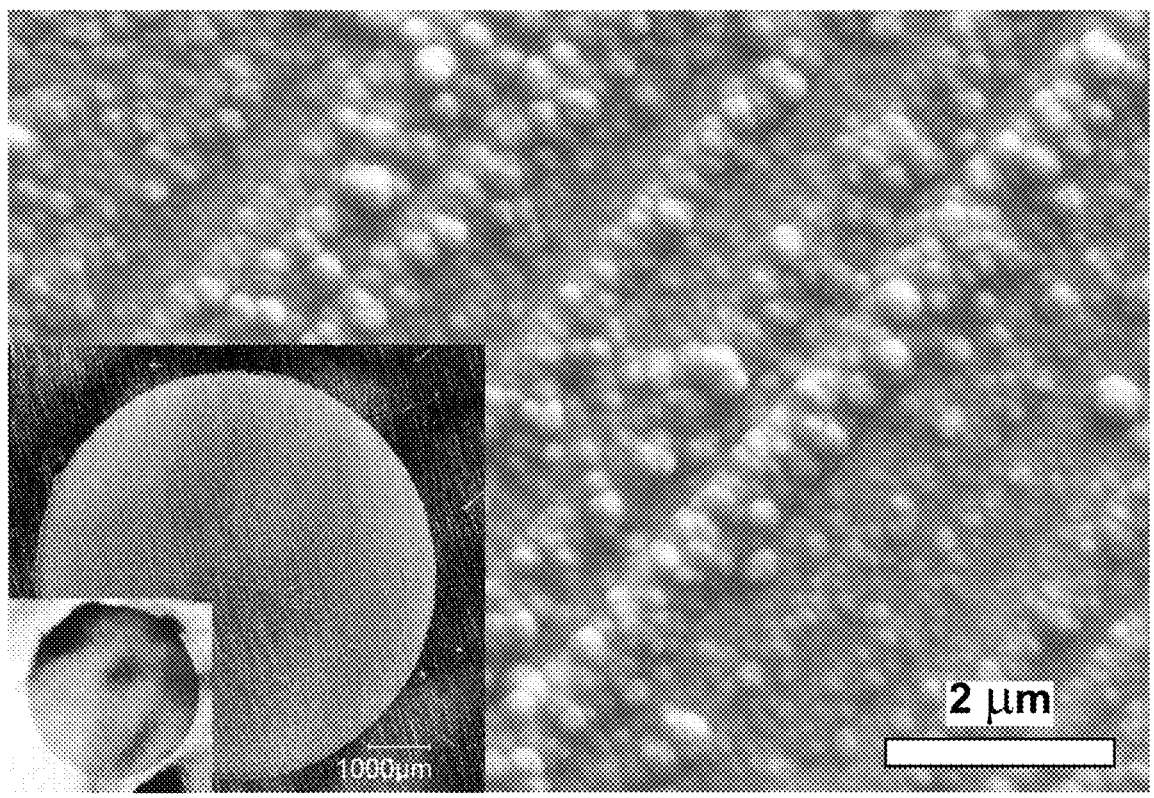
Figure 1C:
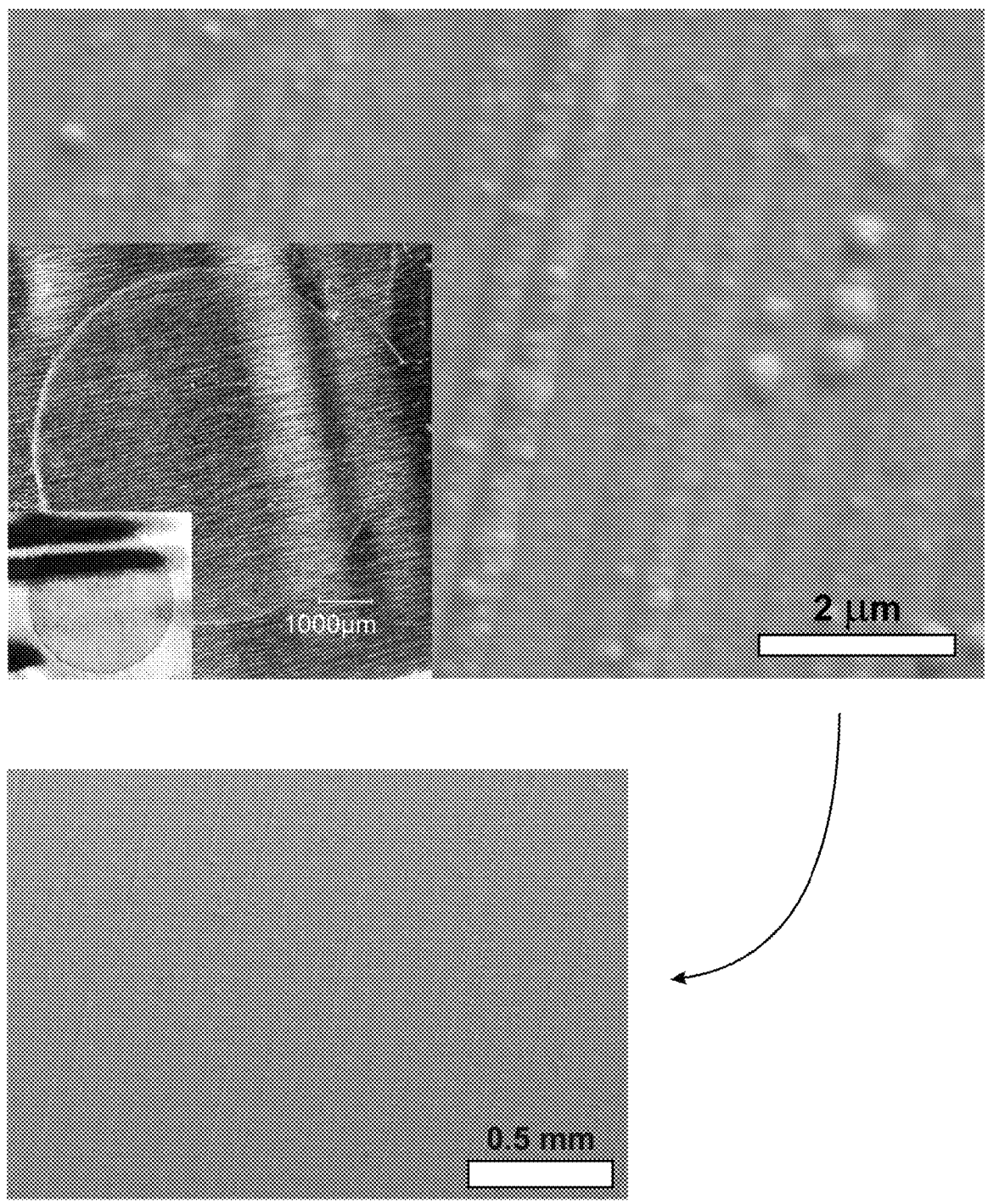
Figure 1D:
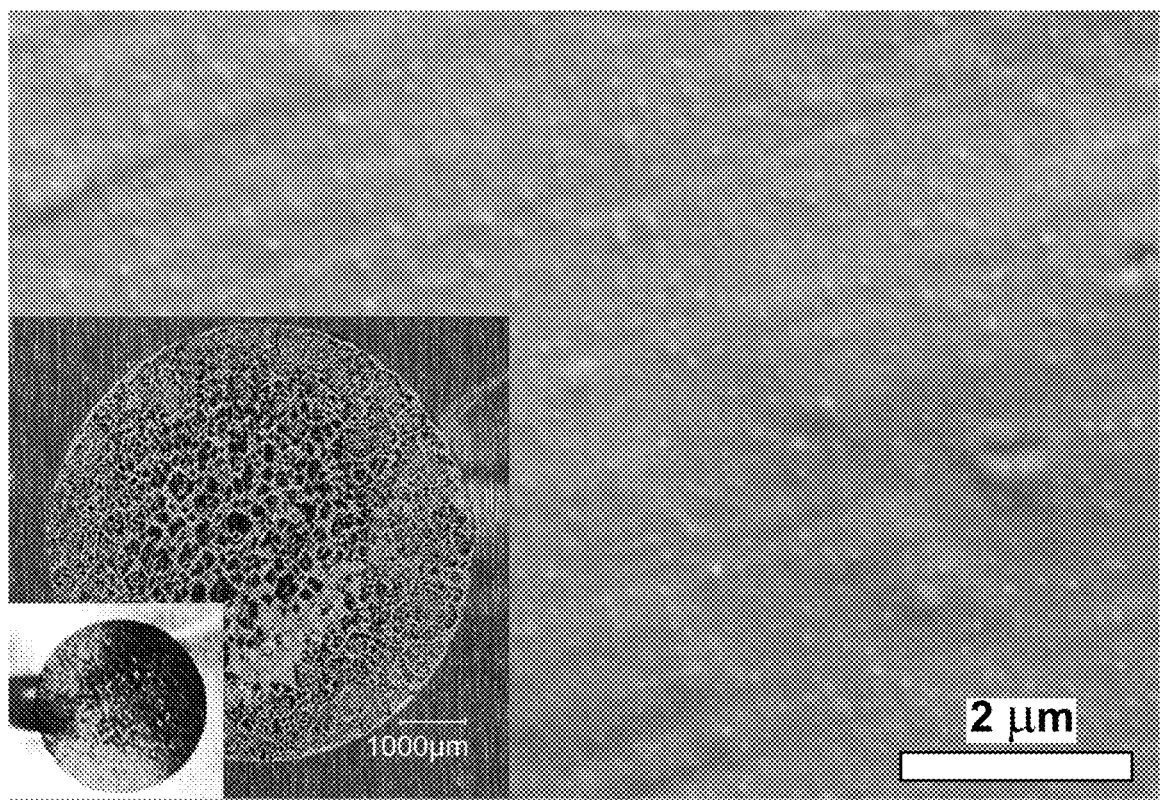
Figure 1D:
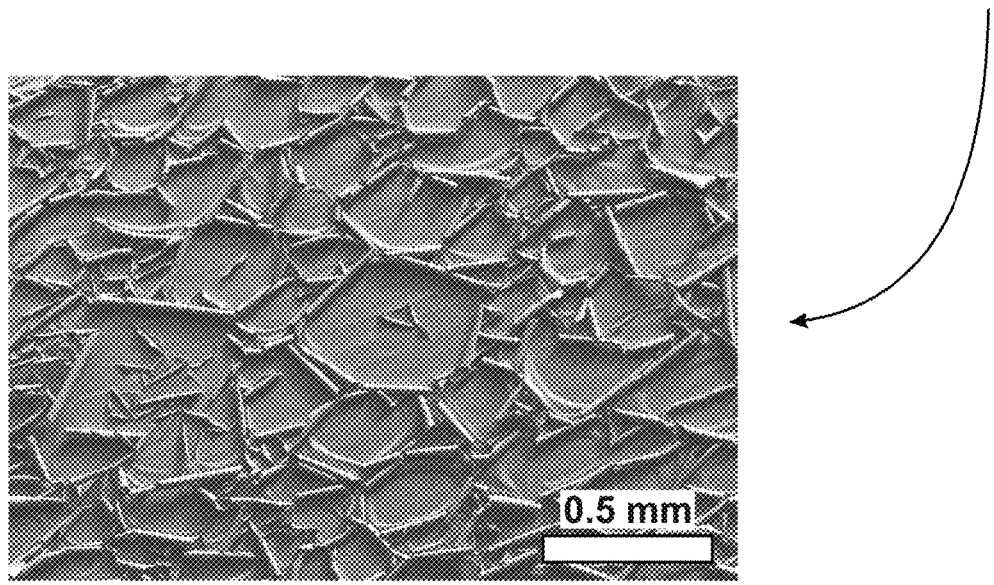

As stated above, we have developed a new platinum-gold alloy that offers low wear, low coefficient of friction, low corrosion rate, and high electrical conductivity. The alloy is electrodeposited from an acidic aqueous electroplating bath containing metal precursor salts for gold and platinum. The alloy composition includes more than 50 atomic percent platinum. The microstructure of the alloy is characterized by generally ellipsoidal grains, most of which have a major axis of 10 nm or less.

To characterize the tribological properties of our alloy, we measured the wear rate and coefficient of friction of representative samples. Our measurement techniques are described below:

The wear rate of a metal coating is determined by a combination of factors including the degree and organization of nanostructuring (i.e., structural organization on a scale of less than 100 nm), the adhesive strength of the coating onto substrate material, the internal stress of the coating, the thermal stability of the coating, and the composition of the alloy.

According to one common practice, the wear rate is determined from the volume of a coating worn during a specific cycle count on a linear path of known distance under a known load. We attempted to measure the wear rate of a representative film of our alloy by that technique. More specifically, we performed wear measurements on a coating deposited on a gold layer (made by sputtering of gold) on copper foil, using 10,000 cycles of a sapphire sphere traversing a 5-mm track under a load of 0.1 N. Under examination by HR-TEM, no wear of the platinum-gold coating was observed, although the underlying substrate was indented by about 300 nm.

For a separate sample, we performed wear measurements on a coating deposited on a gold strike layer on phosphor-bronze foil using 10,000 cycles of a sapphire sphere traversing a 5-mm track under a load of 1.0 N. Under examination by HR-TEM, no wear of the platinum gold-coating was observed. According to our best estimate based on characterization of the entire wear track by means of interferometry, we believe that the wear was less than $3 \times 10^{-7}$ mm3/N-m.

The coefficient of friction of a metal coating is the result of factors including the surface topography of the substrate and the underlying material being contacted. We measured the coefficient of friction of a representative coating of our alloy, deposited on a phosphor bronze machined coupon. For motion parallel to the striations of the machining, we found a coefficient of friction of approx. 0.1 for 10,000 cycles under 1.0 N load of a sapphire sphere of 3.2 mm diameter (corresponding to a maximum Hertzian stress of 1.1 GPa).

For another sample, in which the platinum gold coating was deposited on a gold strike layer over phosphor-bronze, we measured a coefficient of friction for motion transverse to the striations of machining of approx. 0.2 or less, for 8,000 cycles under 0.1 N load of a sapphire sphere. For yet another sample, in which the platinum-gold coating was deposited on a gold layer (prepared by sputtering) over copper foil, we measured a coefficient of friction of approximately 0.2 under 0.1 N load of a sapphire sphere.

Porosity, which is measured as a percentage ratio of void volume to total volume, is another important property of alloy coatings. Porosity generally has an undesirable impact on mechanical properties such as strength, ductility, and internal stress, and it can also affect wear rate, resistance to corrosion, chemical stability, and resistance to diffusion. Generally, voids are found at higher concentrations (by one or more orders of magnitude) in films deposited by physical vapor deposition (PVD) than in electrodeposited films. A useful reference in this regard is J. W. Dini, "Properties of Coatings: Comparisons of Electroplated, Physical Vapor Deposited, Chemical Vapor Deposited and Plasma Sprayed Coatings," Mat. Manufact. Process. (1997) 437-472.

We evaluated the porosity in samples of our alloy films by electron microscopy. Generally, we found that on average, the voids in our samples had up to ten times the diameter and up to ten times the volume fraction of comparable films made by PVD.

The incidence of voids, measured as volume fraction, that we observed was also about ten times what we would be typical in an electroplated hard gold or nickel film, both of which have much larger grain sizes than our platinum-gold alloy films. Although the amount of void space was atypically large, it is noteworthy that this high number was accounted for by a high density of voids that, atypically, were very small.

As mentioned above, some experts believe that reducing the void fraction tends to improve film properties. However, this belief is not universal; others believe that some porosity can enhance properties such as wear rate and coefficient of friction.

By our estimates, films can be prepared with a volume fraction of voids in the range 1% to 10%.

The thickness of a coating directly impacts the functional capability of the coating, including its lifetime, which can be estimated from the ratio of the anticipated wear rate and coating thickness. The thickness of a coating is also significant to the performance of the coating, because patterning of the first micrometer or so of a coating from the substrate structure will generally result in an interfacial structure that differs qualitatively from the bulk structure of the film. It is also noteworthy in this regard that the total stress in the film is a primary factor in determining the maximum coating thickness that is achievable. Electrodeposition is advantageous in this regard, because coatings one inch or more in thickness can be realized through electrodeposition.

In representative samples, we deposited films of our alloy on copper and nickel substrates that were up to 5 μm or more in thickness. Notably, the deposition rate for these was rapid, with values near 1 □m/minute.

Electroplating Bath. An aqueous electroplating bath for the electrodeposition of a platinum-gold coating as described here includes a halide platinate salt (acidic or with a cation from Group I or Group II) with halide aurate salt (acidic or with a cation from Group I or Group II), with a bromide or iodide supporting electrolyte, a chemical for pH adjustment, and one or more chemicals for adjusting stress of the deposit and/or surface tension. We found that is preferable to avoid using a chloride supporting electrolyte.

Currently preferred halide platinate and halide aurate salts include bromide and iodide salts, but not chloride or fluoride salts.

Example reagents for pH adjustment are NaOH and HBr. Bromide and iodide anions are acceptable, but chloride should be avoided. A currently preferred range is pH of 2-3.

In an example, the aqueous electroplating bath comprises from 0.1 to 100 mM of gold and 25 to 1000 mM of platinum. The particular ratio of platinum-to-gold concentration is critical because, together with the particular deposition conditions (such as voltage or current density), it determines the elemental composition of the film. The total concentration also affects the nucleation process in the solution.

The bromide or iodide supporting electrolyte concentration is in the range from 100 mM to 5000 mM or somewhat more. It is noteworthy in this regard that this component functions as more than just a solution-conductivity modifier. Rather, there is a minimum threshold of electrolyte concentration for forming soluble complex species of the precursors.

Chloride is disfavored as a supporting electrolyte because it causes the precipitation of metal and metal halides once appropriate concentrations of the platinate and aurate precursors are mixed. However, the chloride counterparts may be suitable for deposition of the constituent materials individually.

We evaluated several chemical and electrochemical techniques with the aim of controlling grain morphology and achieving alloy compositions falling within specified ranges.

An early objective was to grow films with smooth surfaces and with small grain size, for example grain sizes less than 100 nm. We found that depositing with high overpotentials was useful for producing small grains, but it tended to increase the porosity and surface roughness of the film, which could render the film unacceptable for some purposes.

To overcome this problem and enable the use of high overpotentials, we found it advantageous to mitigate the otherwise poor growth mechanics by manipulating the system chemically. This was done by adding a selection of complexing agents, grain refiners, and surfactants. In an illustrative example, a grain refiner is added in the concentration range 0.01 mM to 1.0 mM. We also implemented a pulse deposition regime to overcome limitations related to the mechanics of diffusion and to promote a deposition regime of continual grain nucleation.

For further control of the deposition characteristics, we jointly controlled the electrolyte concentration, the bath agitation, and the bath temperature, as well as the deposition protocol as characterized by the voltage, current density, and pulse timing.

It is noteworthy in this regard that the overvoltage applied during deposition is one of the major factors for controlling the deposited composition, although this effect is also dependent on the initial bath concentration, the pH, and the temperature. It is also significant that, as those skilled in the art will understand, the deposition kinetics of platinum and gold are nonlinear. Under suitable conditions, the overvoltage can be controlled to produce multilayer films in which different compositions define the respective layers, and it can be controlled to produce films with compositional gradients.

It is also noteworthy that the grain size is subject to control. Grain sizes of 1-3 nm are generally regarded on the borderline with amorphous structures, and below a grain size of 1 nm, a material would be considered to be amorphous. Although the samples we report here had grain sizes in the range of 5-10 nm, we believe that with suitable control of factors including voltage and current characteristics, initial bath concentrations, pH, temperature, bath agitation, pulse duration, and complexing agents, the grain size can be lowered into the amorphous regime.

We found that films having favorable characteristics can be produced using, in combination, relatively low concentrations of metal precursor, a substantial excess in the electrolyte of platinum over gold (for example, Pt:Au ratios of about 50:1), a small loading of an added grain refiner, and pulsed deposition.

We also found that favorable film properties can be achieved at higher reagent concentrations and under direct current (DC) deposition conditions if a heavier loading of grain refiner (for example, a fifty-fold increase) is combined with surfactant additives in concentrations of about 15 g/L. We found that these additives were necessary to maintain high nucleation-driven deposition, prevent dendritic and rough deposits, and reduce stress in the films as film thicknesses increased.

Accordingly, we believe that with no more than routine experimentation, a suitable set of operating parameters can be found for producing alloy films with desired compositions and morphologies in and near the ranges described here. Such operating parameters will fall within a continuum between a regime in which the deposition chemistry is simple and the pulse parameters are optimized, and a regime of heavily dosed deposition controlled by chemical additives.

Method

Electrochemical bath. The electrochemical baths evaluated in this work used water (MilliQ filtered, 0.055 μS/cm conductivity) as the solvent. The electrolytes tested in this study included hydrochloric acid (HCl, Fisher, reagent grade), potassium chloride (KCl, Sigma, >99%), sodium chloride (NaCl, Sigma, >99%), sodium bromide (NaBr, Sigma, >99%), and sodium iodide (NaI, Sigma, >99%). The surfactants tested in this study were saccharin, sodium salt hydrate (Acros, >99%), sulfonic acid and paratoluenesulfonic acid.

The precursor for gold was either hydrogen tetrachloroaurate(III) or tetrabromoaurate(III), with the non-chloro salt precursor being preferred (as mentioned previously). The precursor for platinum used in this study was dihydrogen hexachloroplatinate(IV) or hexabromoplatinate(IV), with the non-chloro salt precursor being preferred. (Salts were purchased from Alfa Aesar.) Note that this chemical is partially hydrated, and therefore its platinum content is approximate, subject to error due to unknown hydration. For the purposes of this study, all measurements assume that there is no hydration of this salt.

The typical bath used for successful film depositions consisted of 500 mM electrolyte, 50 mM platinum and 0.5 mM gold. Accordingly, it will be understood that the molar ratio of platinum to gold in this particular example was 100.

To minimize hydrogen incorporation into the deposited films and to minimize the effect of hydrogen evolution due to an undesired cathodic side reaction, the bath was purged with nitrogen flow for at least five minutes prior to deposition and continued throughout the depositions. The purpose of the nitrogen flow was to minimize the impact of dissolved oxygen in the bath, but it was not expected to remove all oxygen from the bath or to maintain an oxygen-free bath.

It will be understood that in the particular example described here, the molar ratio of platinum to gold in the bath was 100. More generally, we estimate, based on our exploration of the bath chemistry and pulse characteristics, that ratios in the range 10-1000 may be suitable, with the specific value depending on the particular application.

Electrode materials. The electrode materials used in this work consisted of those for working, auxiliary (counter) and reference electrodes. The selection of working electrode materials, as discussed below, was found to be critical for this work.

Working electrode materials tested included glassy carbon (Alfa, type 1, product code 38024), copper (McMaster Carr, multipurpose 110 foil), copper (mirror finish, 10 μm thick, from Power Sources small dryroom), nickel (Alfa, 99%+ foil, product code 42634), electrodeposited gold (Technic, acid gold strike RTU) on McMaster Carr foil or 10 μm, mirror-finish copper foil, electrodeposited nickel (Ni sulfamate bath, home-made) on McMaster Carr foil or 10 μm, minor-finish copper foil, and sputtered gold on McMaster Carr copper foil.

We also deposited example coatings on phosphor bronze metal foil, specifically on 510 phosphor bronze sheet at 0.008" thick and on 510 phosphor bronze shim stock at 0.04" thick, both from McMaster-Carr.

The surface preparation of the working electrode materials was material specific, but always with the objective of ensuring that the material passed the water-break test, i.e., the surface was cleaned from organic contaminants such that when water is set on the material surface, the water spreads rather than beads up.

For materials such as glassy carbon, surface preparation consisted of bath sonication in soapy (Alconox) water followed by extensive rinsing.

For oxidizable materials such as nickel or copper, surface preparation consisted of exposure to dilute acid (e.g., approx. 1% v/v HCl) for tens of seconds, followed by extensive rinsing.

In the case of the gold sputtered on copper foil (McMaster Carr), the substrate from which the most significant and best results were obtained in this study, the gold was cleaned of possible organic residue with an IPA rinse, followed by water rinse, then exposed to dilute acid (approx. 1% v/v HCl) for tens of seconds, followed by water rinse. Although the acid exposure was likely not needed, it was performed as a precautionary measure against potential organics that remained after the IPA rinse.

In the case of the phosphor bronze, the PtAu coating was preceded by a soft gold (99.9% purity) strike of about 50 nm thickness.

The working electrode area was typically 0.32 cm2, with a circular perimeter defined by a Kapton or polyester donut tape with an inner diameter of 0.25 inches. To make a good seal and ensure deposition only on the intended area, Kapton tape was used to cover the back side of the working electrode and connected to the front side donut, with adhesive bonding to adhesive. The electrical contact was made through a strip of copper tape, also masked from the chemistry.

Stability for the electrode configuration was provided by a glass slide backing.

The auxiliary (counter) electrode used in this study was a platinum mesh, with a surface area approximately ten times that of the working electrode. The reference electrode used in this study was a Ag/AgCl (3M NaCl, BASi) electrode, measured daily against a pristine reference electrode to ensure its function.

Electrochemical cell. The electrochemical cell consisted of a 150 mL beaker holding a liquid volume of typically about 50-100 mL. The beaker size was sufficient to allow for set-up in the liquid of the working, auxiliary, and reference electrodes, a sparger for nitrogen flow, and a thermometer. Typically, the working electrode faced the auxiliary electrode at a distance of about one inch.

The beaker was agitated using a 1-inch stir bar set to rotate at 600 rpm by a hot/stirplate. Given the acidic nature of the bath and susceptibility of the working electrode to some degree of chemical dissolution, the typical experiment was run such that deposition began within approximately five seconds of the working electrode being set into the bath (for a constant current experiment), or such that deposition occurred when the working electrode was set into the bath (i.e., going in "hot" in constant-voltage experiments).

Results. In experimental trials, films deposited on non-gold substrates tended to grow in a highly stressed mode. Also, our bath chemistry tended to rapidly etch substrates of copper and, to a lesser extent, nickel.

On gold-coated substrates, by contrast, we were able to exert control over the platinum and gold composition in the film, and to produce a uniform Pt/Au composition in the film as evidenced by electron dispersive X-ray spectroscopy (EDS) mapping. Powder X-ray diffraction (XRD) measurements showed that we could deposit platinum in nanocrystallites, although obscuration by crystallites in the gold strike layer prevented us from measuring the crystallite size in the electrodeposited gold film.

We were also able to deposit a relatively specular (rather than matte/dendritic) film on a gold-coated substrate. This was made possible by the design of the electrodeposition protocol and by the choice of anion, the use of surfactant, or both. In a trial, we deposited a film about 0.5 μm or more in thickness that was specular and that adhered well. It survived the ASTM D3359 tape test and the ASTM B571 bend test.

The gold-coated substrate used in some of our trials was a sputtered gold film on copper foil. For practical applications, however, it will generally be more advantageous to perform the alloy electrodeposition on a gold strike layer. We found it beneficial to use saccharine surfactant as a stress reducer. Without wishing to be limited by mechanism, we propose that the reduced stress and greater specularity that we observed are attributable to the way saccharine, which is an anionic surfactant, mitigates the hydrogen-evolution reaction.

The primary variables that we explored were temperature (with no surfactant) for NaCl electrolyte baths, and for pulsed deposition, the effect of pulse duration at a fixed deposition current density. In trials, the current density was fixed at 15 mA/cm2, which was selected to minimize stress in the resulting films. In trials, we also varied current densities over the range 1-40 mA/cm2. We also considered the effects of anion choice and surfactant.

FIGS. 1A-1D illustrate, by way of example, a path we took toward optimization. The figures show micrographs of electrodeposited films, showing how initial consideration of direct current (DC) plating in NaCl electrolyte with no surfactant (grain refiner) led to a relatively rough, matte film. Then, by adding surfactant, the film quality improved from the standpoint of surface roughness.

By changing from DC to pulsed plating, the film surface dramatically improved, becoming smooth and yielding a platinum-colored and relatively specular appearance. Notably, the current density applied during pulsing could not be too high or else stress increased to the point of film cracking.

Then, the effect of varying the anion of the bath chemistry was explored. Depositions were performed at each of three pulsed conditions (varying pulse duration, with pulse cycle count varied so that total deposition charge was constant), with Cl—, Br—, and I— as the electrolyte anion.

It is important to note in this regard that saccharine surfactant was used in the Cl— bath because without it, we obtained very poor quality (matte, often cracked) films.

For all tests, the precursor concentration was 50 mM platinum and 0.5 mM gold. If saccharine was used, 0.1 mM was found to be the most optimal concentration.

The sample shown in FIG. 1A was deposited with DC plating at a current density of 10 mA/cm2 to yield a film with 86 at. % platinum and an average grain size of about 5.4-nm. The product was a high specific surface area deposit with a non-specular, matte surface. The sample shown in FIG. 1B was deposited with DC plating at a current density of 10 mA/cm2 with added grain refiner to yield a film with 72 at. % platinum and a grain size of about 5.4-nm. The deposition was believed to be mass-transport limited. The product exhibited surface roughness. The sample shown in FIG. 1C was deposited with pulsed plating at a current density of 15 mA/cm2 with added grain refiner to yield a 5.0-nm grain size film with 73 at. % platinum. The product was a relatively smooth, specular film. The inset to the figure shows a view with increased magnification. The sample shown in FIG. 1D was deposited with pulsed plating at a current density of 30 mA/cm2 with added grain refiner to yield an 8.0-nm grain size film with 87 at. % platinum. The current density was believed to have been excessive in this trial. Stress-induced delamination was observed. The inset to the figure shows a view with increased magnification.

All of the films represented in FIGS. 1A-1D passed an ASTM tape test for adhesion and a 180° bend test.

Figure 2:
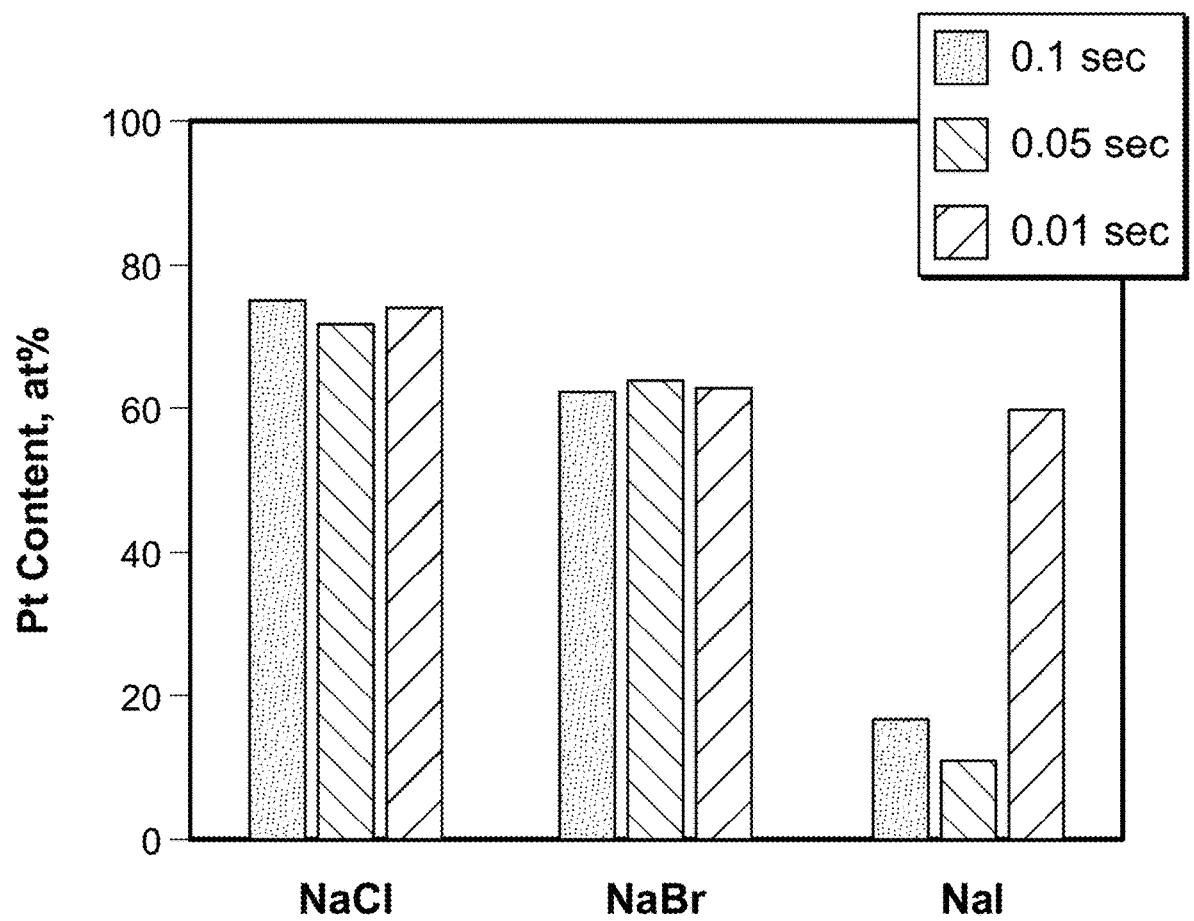
FIG. 2 is a bar chart showing platinum atomic fraction in an example film as a function of deposition protocol and anion.

FIG. 2 is a bar chart. It shows the platinum fraction (expressed as atomic percent) as a function of deposition protocol and anion. For this study, we had a target value of 80 at. % platinum. The respective anion (as the anion of a sodium salt) is listed on the horizontal axis, and the platinum fraction is plotted on the vertical axis. For each of the three anions that are represented, respective values are plotted for deposition pulse durations of 0.01 seconds (the right-hand bar in each group), 0.05 seconds (the middle bar in each group), and 0.1 seconds (the left-hand bar in each group). (The pulses for these trials had "on" and "off" half-cycles of equal lengths. The durations given here are for each half-cycle.) Accordingly, nine cases are represented in the figure.

It will be seen in FIG. 2 that at a pulse duration of 0.01 seconds, platinum fractions of about 60%-70% were achieved for all three anions. Similar results were observed at the other pulse durations for the chloride and bromide anions, but substantially smaller platinum fractions were observed for the iodide anion.

Figure 3A:
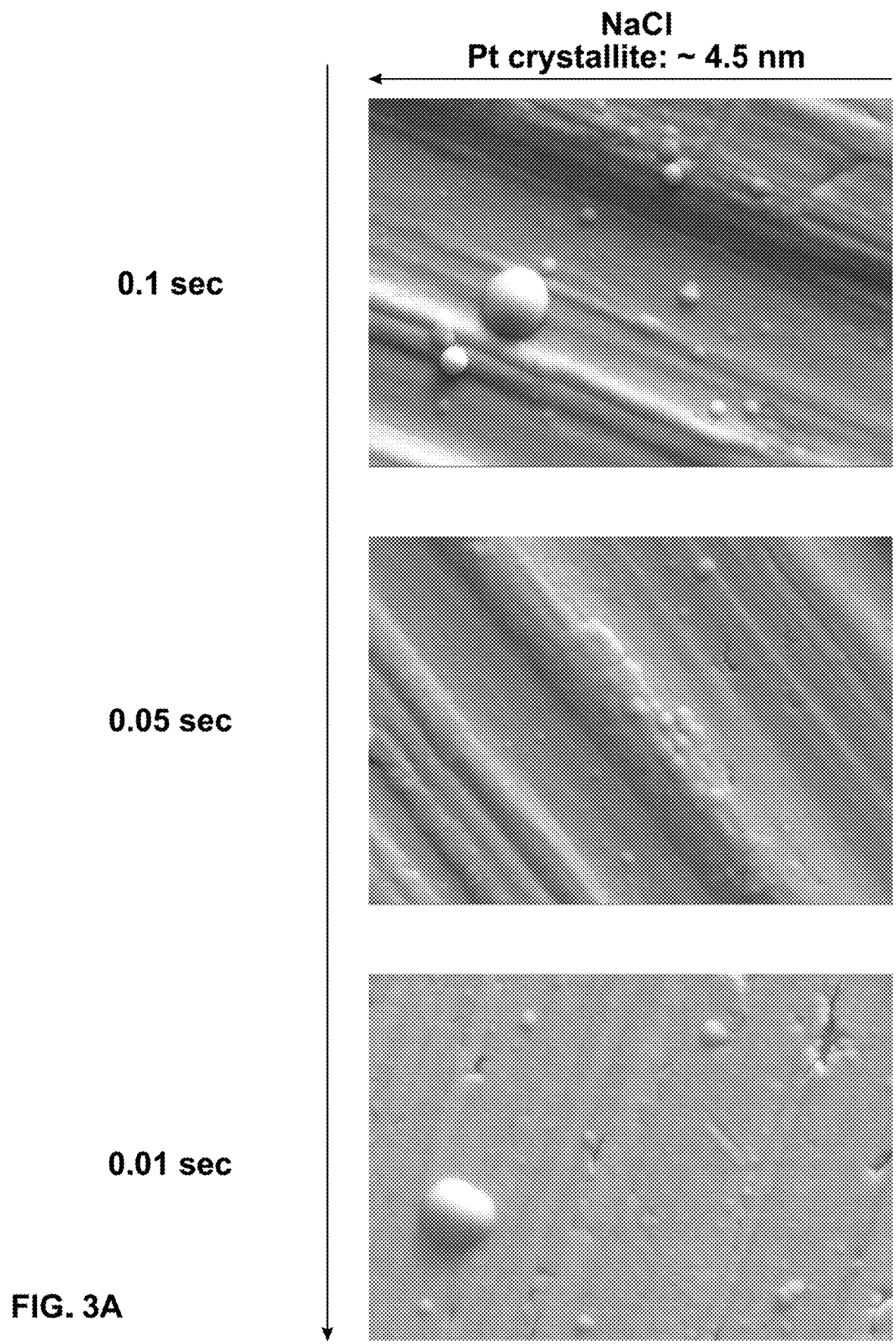
FIGS. 3A-3C provide SE2 (Type II secondary electron) plan view images of PtAu alloy deposits at 15 mA/cm2 pulses of variable durations and with Cl—, Br— or I— as the electrolyte anion. Arrows indicate the direction of increasing film density.
Figure 3B:
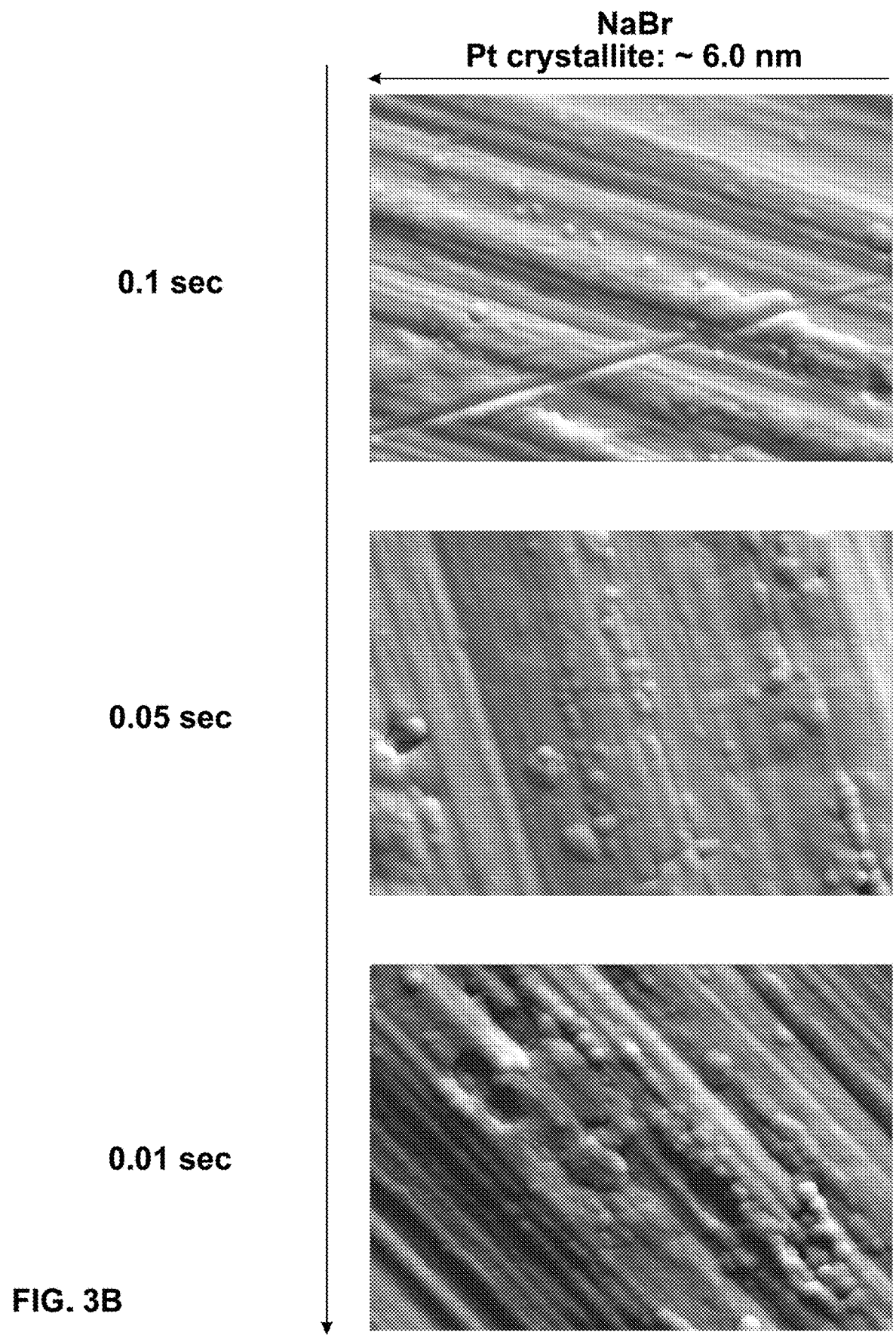
Figure 3C:
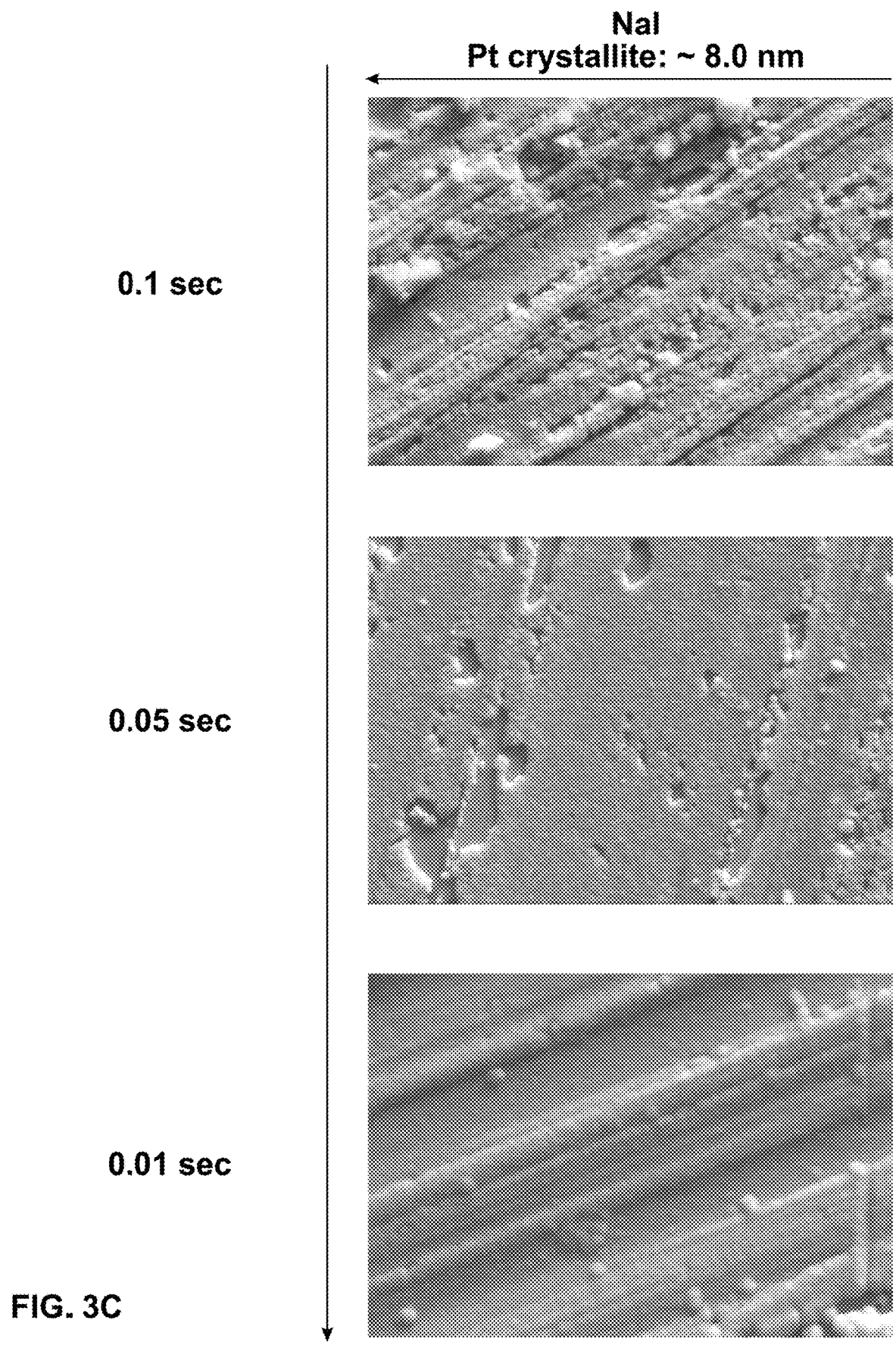

FIGS. 3A-3C are a set of SEM images of respective films deposited according to the nine cases plotted in FIG. 2. For each type of film, the figure shows the morphology of a representative area. We measured the typical grain size of platinum by XRD for each anion category. FIG. 3A shows the images for the chloride anion at each pulse duration, FIG. 3B shows the images for the bromide anion at each pulse duration, and FIG. 3C shows the images for the iodide anion at each pulse duration. The approximate results were a grain size of 4.5 nm for chloride, 6.0 nm for bromide, and 8.0 nm for iodide. Notably, the pulse condition did not significantly impact the measured platinum grain size. It is noteworthy that except for the NaBr deposition with 0.01-second pulses, the films passed both the ASTM tape and bend tests.

Figure 4:
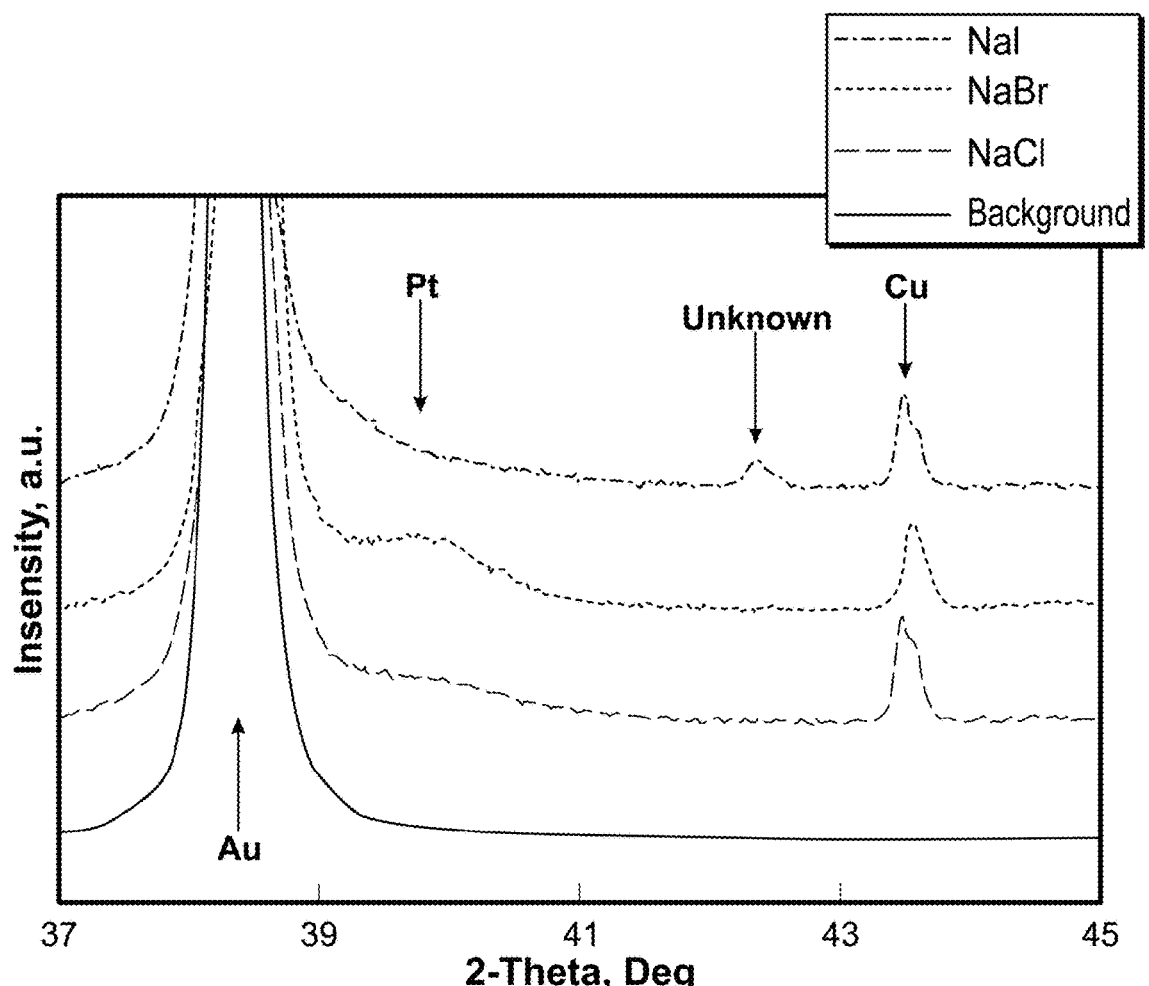
FIG. 4 provides x-ray diffraction (XRD) patterns of substrate (background) versus three types of films (as a function of three anions that were tested).

FIG. 4 shows the typical XRD patterns for the background substrate and the three types of samples, i.e., the samples deposited with the three respective anions. The traces for the XRD patterns are respectively labeled "Background", "NaCl", "NaBr", and "NaI". The platinum grain size was measured from the platinum diffraction peak at about 39.8° 2θ. Note that the gold signal was a convolution between the gold within the film and the gold in the PVD film that served as the substrate for growth.

Interestingly, there was a distinct signal at between 42° 2θ and 43° 2θ for the films deposited from an electrolyte of NaI. This was not investigated further.

Example 1

PtAu alloy films were deposited on phosphor bronze substrates pre-plated with nickel. The PtAu coatings were deposited upon a soft gold (high purity, 99.9%) strike of about 50 nm thickness or less.

A plating bath was prepared with 50 mM $H_2PtBr_6$, 0.5 mM $HAuBr_4$, 0.2 mM saccharine, and 500 mM NaBr. The platinum and gold salts were separately dissolved in NaBr electrolyte solutions before combining. The bath pH was adjusted with NaOH or HBr to 2.2-2.4 at 22° C.

The counter electrode was platinum mesh placed at a distance of about 5 cm.

There was no agitation or nitrogen purge of the bath during the deposition.

We deposited a film about 300 nm thick with 5000 cycles of pulse plating, which consisted of the following two steps in alternation: (i) −9.6 mA/cm2, 0.05 sec; (ii) −0.1 mA/cm2, 0.05 sec. Within thirty seconds after deposition was complete, we removed the workpiece from the bath.

A sample prepared as described above was subjected to tribological testing. We performed reciprocating wear tests in which a spherical sapphire ball ⅛ inch in diameter traveled back and forth in contact with the deposited coating.

There were 10,000 cycles of wear, with 5 mm of forward travel and 5 mm of reverse travel in each cycle at a velocity of 1 mm/s. A first test was run with a contact force of 1 N (1.1 GPa maximum Hertzian stress), and a second test was run with a force of 100 mN (0.11 GPa maximum Hertzian stress).

The track of the sapphire ball ran parallel to the machining marks, i.e., the striation marks typically seen in a machined foil.

For each test, we measured the coefficient of friction (as averaged over one cycle) as a function of the cycle number, and we measured an end-of-test (EOT) average cross section of the track. This average cross section represents the average of the measured heights along the full length of the track, for each position along an axis perpendicular to the track.

The coefficient of friction observed in the 1 N test was about 0.1, and the coefficient of friction observed in the 100 mN test ranged between 0.1 and 0.2. These are very low values, more typical of PTFE nanocomposites than of platinum-gold PVD films.

Figure 5:
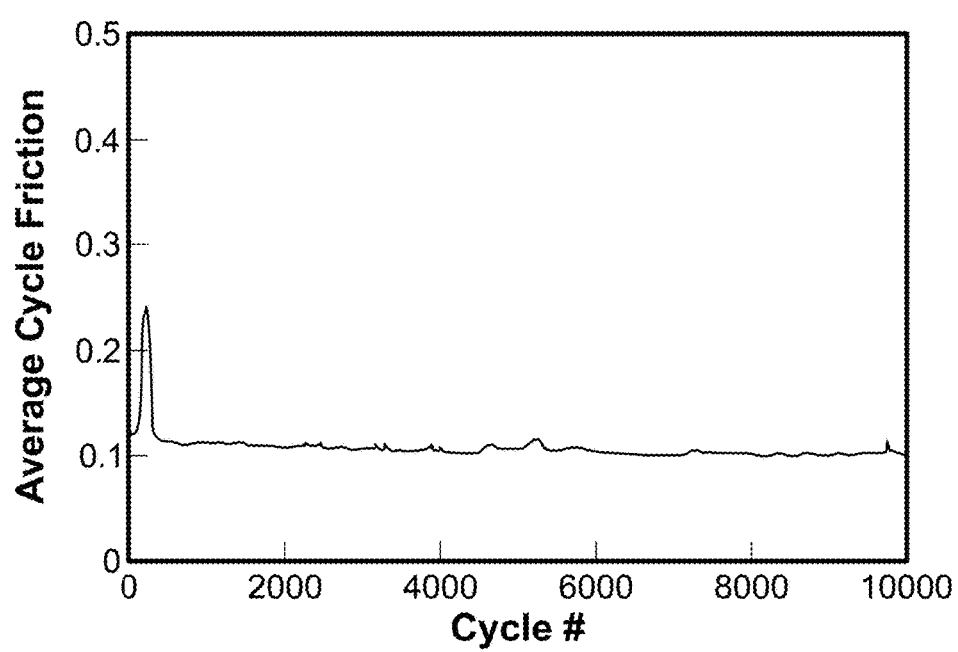
FIGS. 5 and 6 are, respectively, the graph of coefficient of friction versus cycle number and the EOT average cross section for a 1 N wear test.
Figure 6:
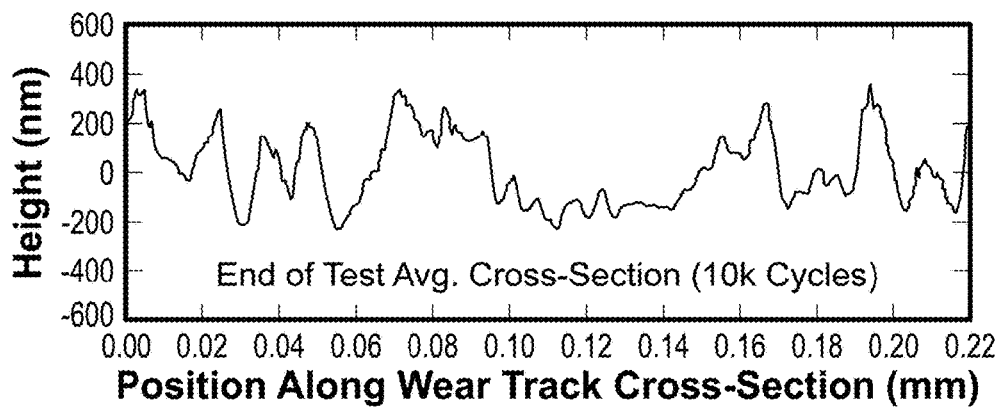
Figure 7:
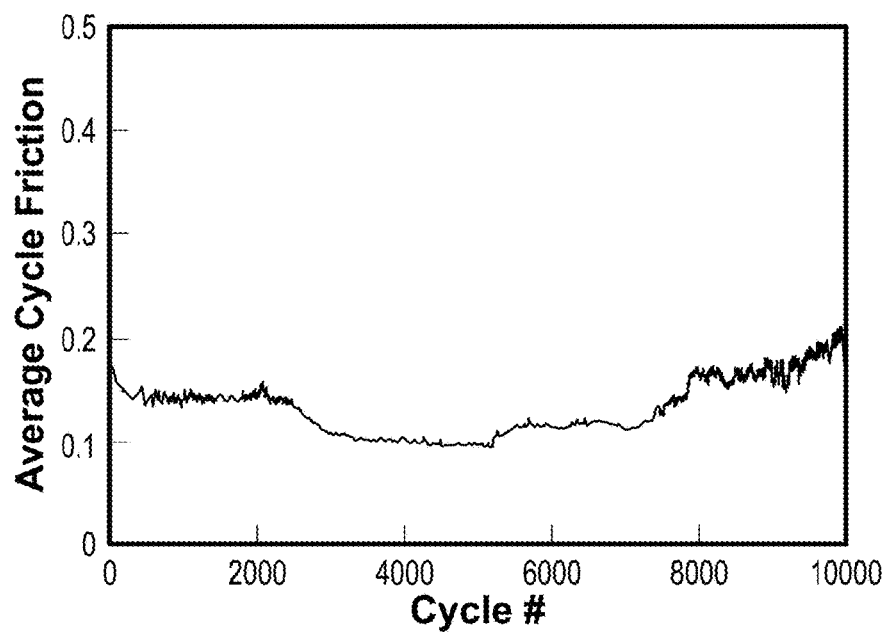
FIGS. 7 and 8 are, respectively, a graph of coefficient of friction versus cycle number and the EOT average cross section for a 100 mN wear test.
Figure 8:
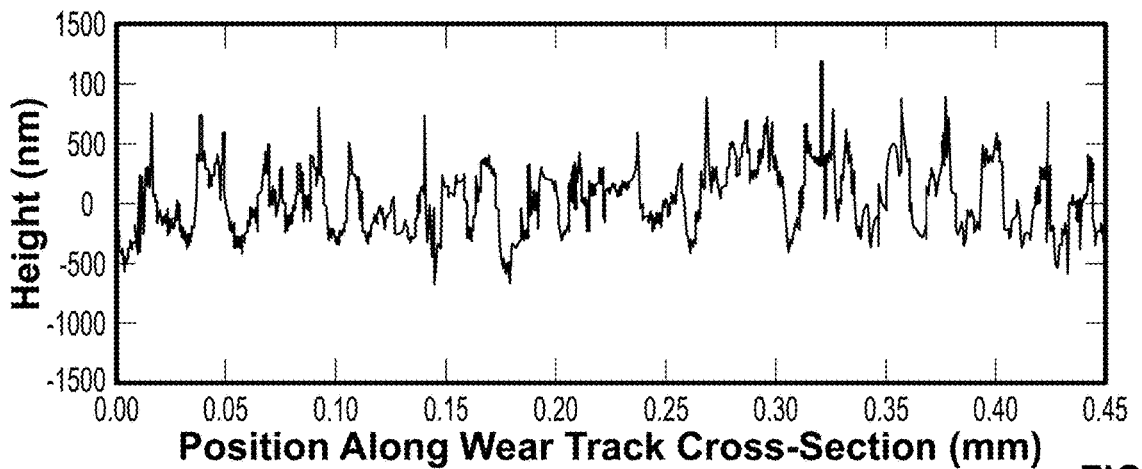

FIGS. 5 and 6 are, respectively, a graph of the coefficient of friction versus cycle number, and a graph of the of the end-of-test (EOT) average cross section for the 1 N test. FIGS. 7 and 8 are, respectively, the graphs of coefficient of friction versus cycle number, and of the EOT average cross section for the 100 mN test.

Without examination using an electron microscope, we were unable to discern any measurable wear. However, based on interferometer measurements taken in the 1 N test, we believe that wear was less than 3×10-7 mm3/N-m.

It should be noted in this regard that it was difficult to estimate the amount of wear because of the macroscale roughness of the substrate material. It should also be noted that according to our observations, the film in the wear track was exceptionally flat.

Example 2

An alloy film was prepared as described in Example 1, above.

FIGS. 9-13 are scanning transmission electron micrographs taken by high-angle annular dark-field imaging (HAADF). They show a portion of the deposited film in cross section, at different magnification levels.

In this micrographic study, we observed that the platinum-gold film was granular in structure, with the majority of grains generally ellipsoidal with a major axis of 5-10 nm. On examination of the micrographs, it will be seen that the Pt—Au microcrystallites, which appear white in these images, are interspersed with contrasting dark spots. Although the interpretation of these dark spots is not certain and we do not wish to be bound by any particular interpretation, our current belief is that the dark spots are nanoscale voids.

Figure 9:
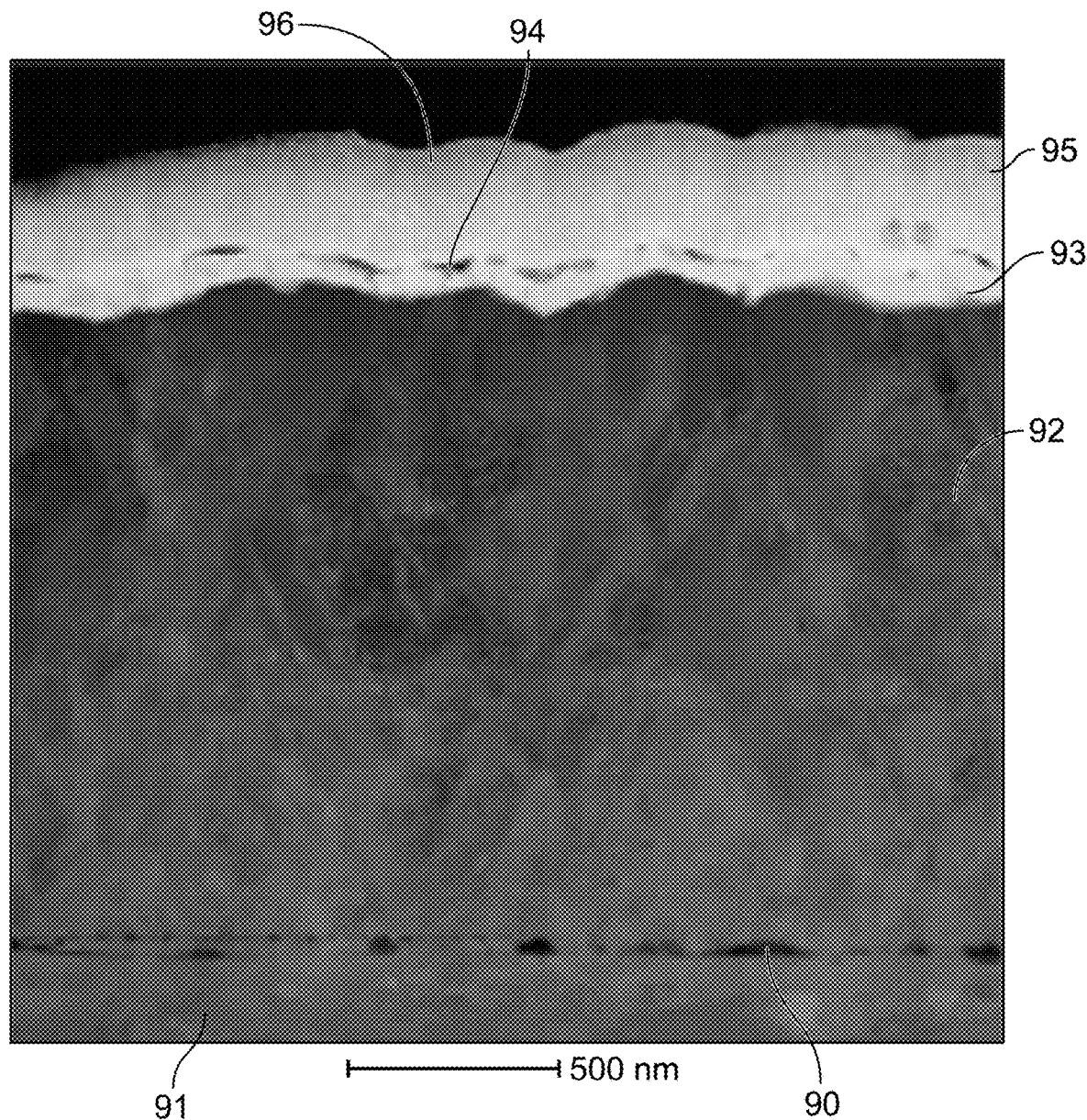
FIGS. 9-13 are scanning transmission electron micrographs taken by high-angle annular dark-field imaging (HAADF). They show a portion of a deposited film in cross section at different magnification levels.

In the FIG. 9 image, voids 90 are visible at the interface between the copper substrate 91 and the overlying nickel layer 92. The gold strike layer 93 is seen at the top of the nickel layer, with visible voids 94 between the gold strike layer and the platinum-gold alloy layer 95 above it. A thin, gold-rich layer 96 of platinum-gold alloy is seen at the top of the alloy film.

Figure 10:
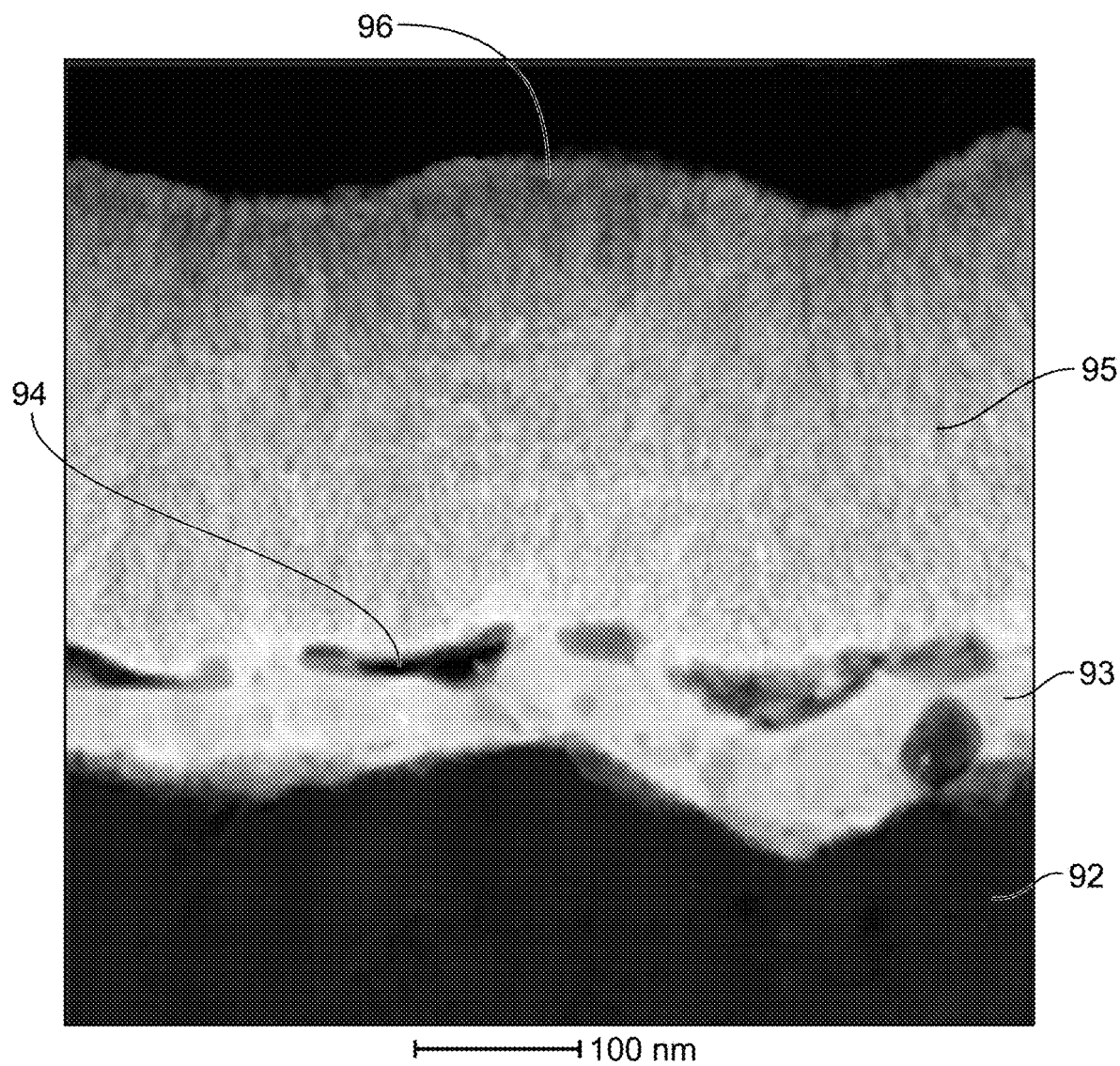

FIG. 10 shows the vicinity of the alloy layer 95 and its interface with the nickel layer 92 at greater magnification. The interfacial features noted above are visible. The grain size in the main alloy layer is seen to be in the range 5-10 nm. The alloy film is seen to exhibit columnar growth. Dark spots visible in the alloy film are believed to represent nanoscale voids.

Figure 11:
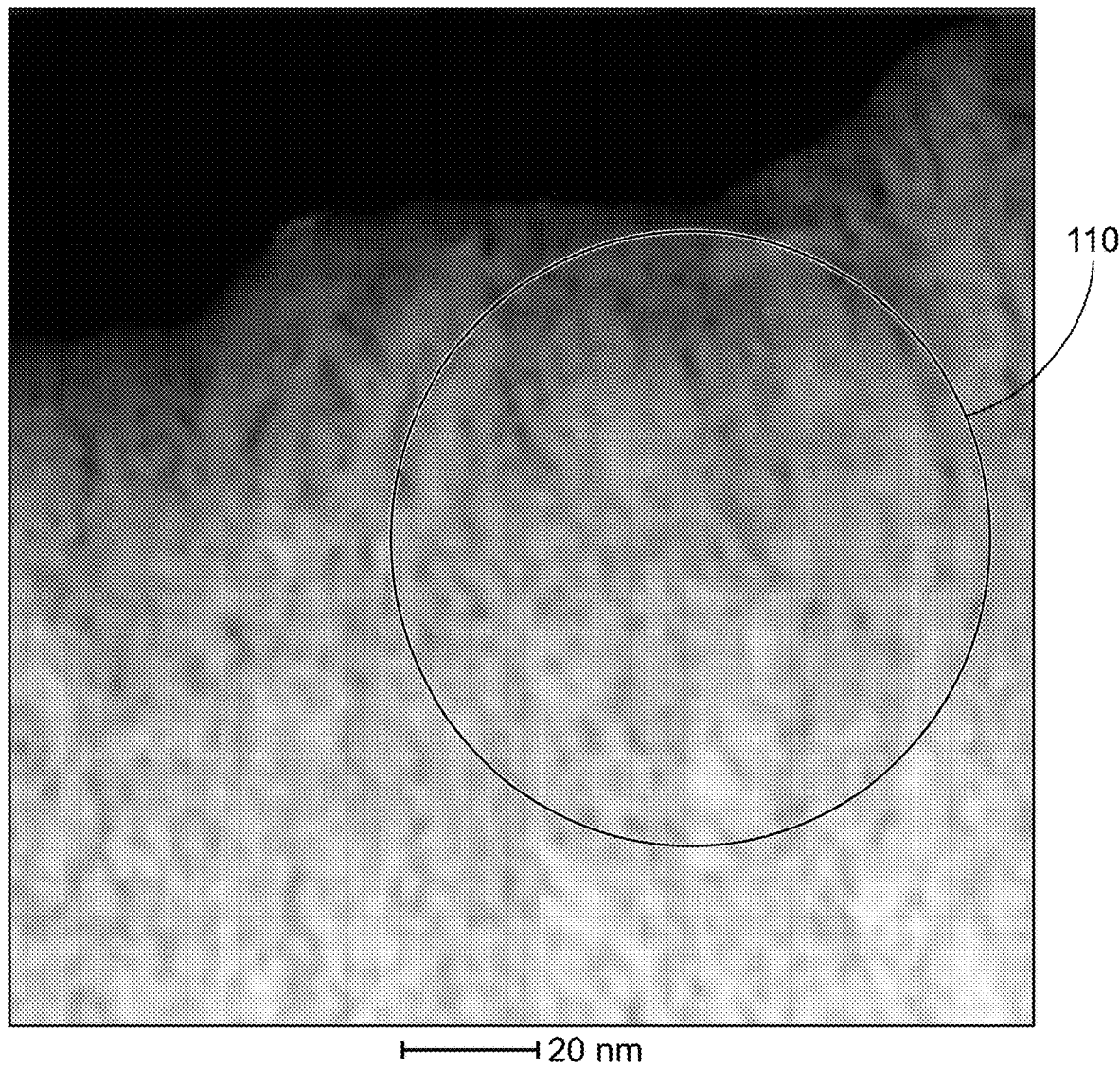

FIG. 11 shows a portion of the alloy film at still greater magnification. A circle 110 superimposed on the image designates a selected area that is shown at even greater magnification in FIG. 12. White particles visible in FIG. 11 are believed to be platinum-gold alloy nanocrystals with a grain size of about 5-10 nm. Dark spots visible in the image are believed to be nanoscale voids.

Figure 12:
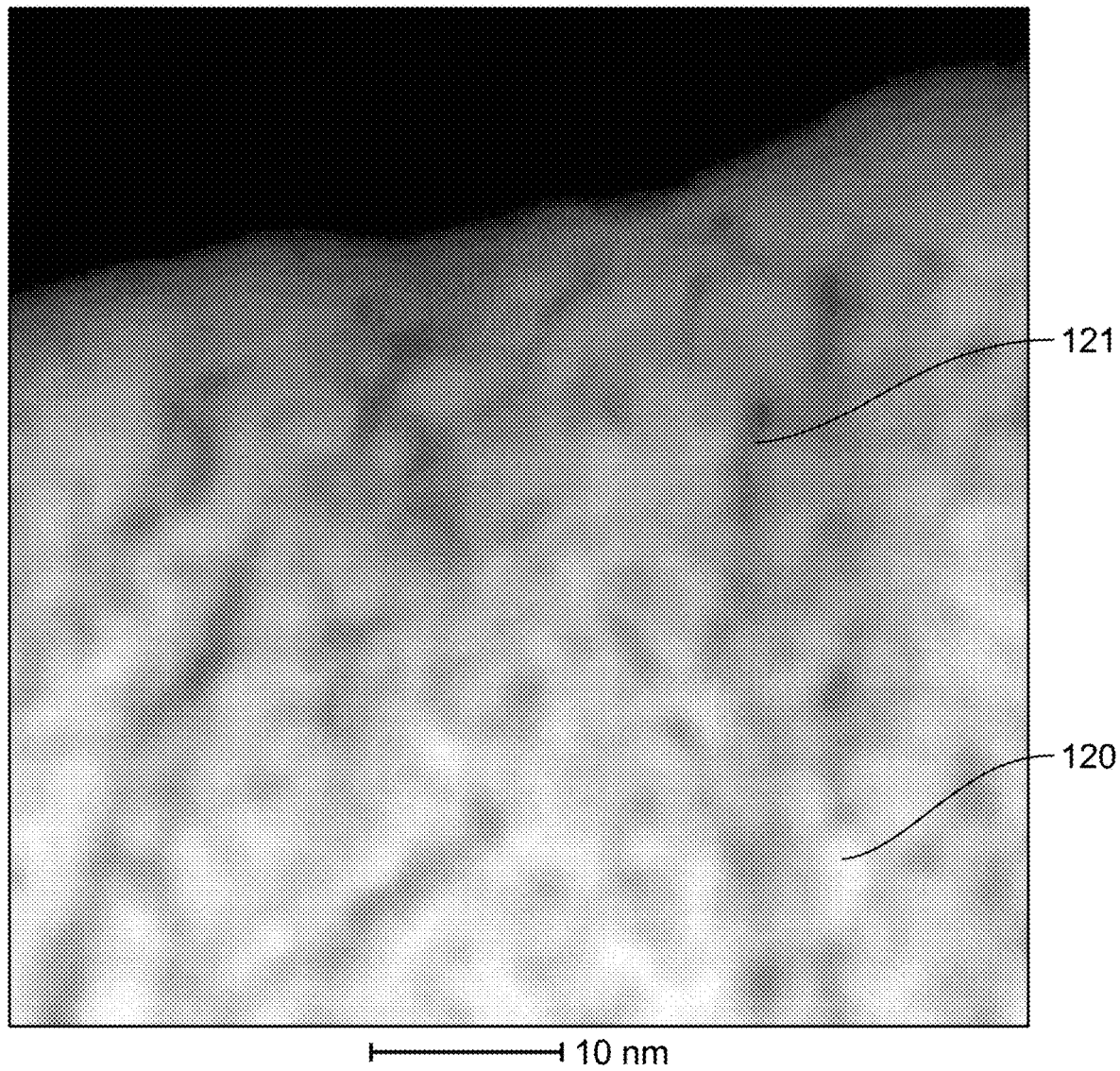

FIG. 12 is an image of the designated area of FIG. 11 at greater magnification, with the white particles 120 and dark spots 121 clearly visible.

Figure 13:
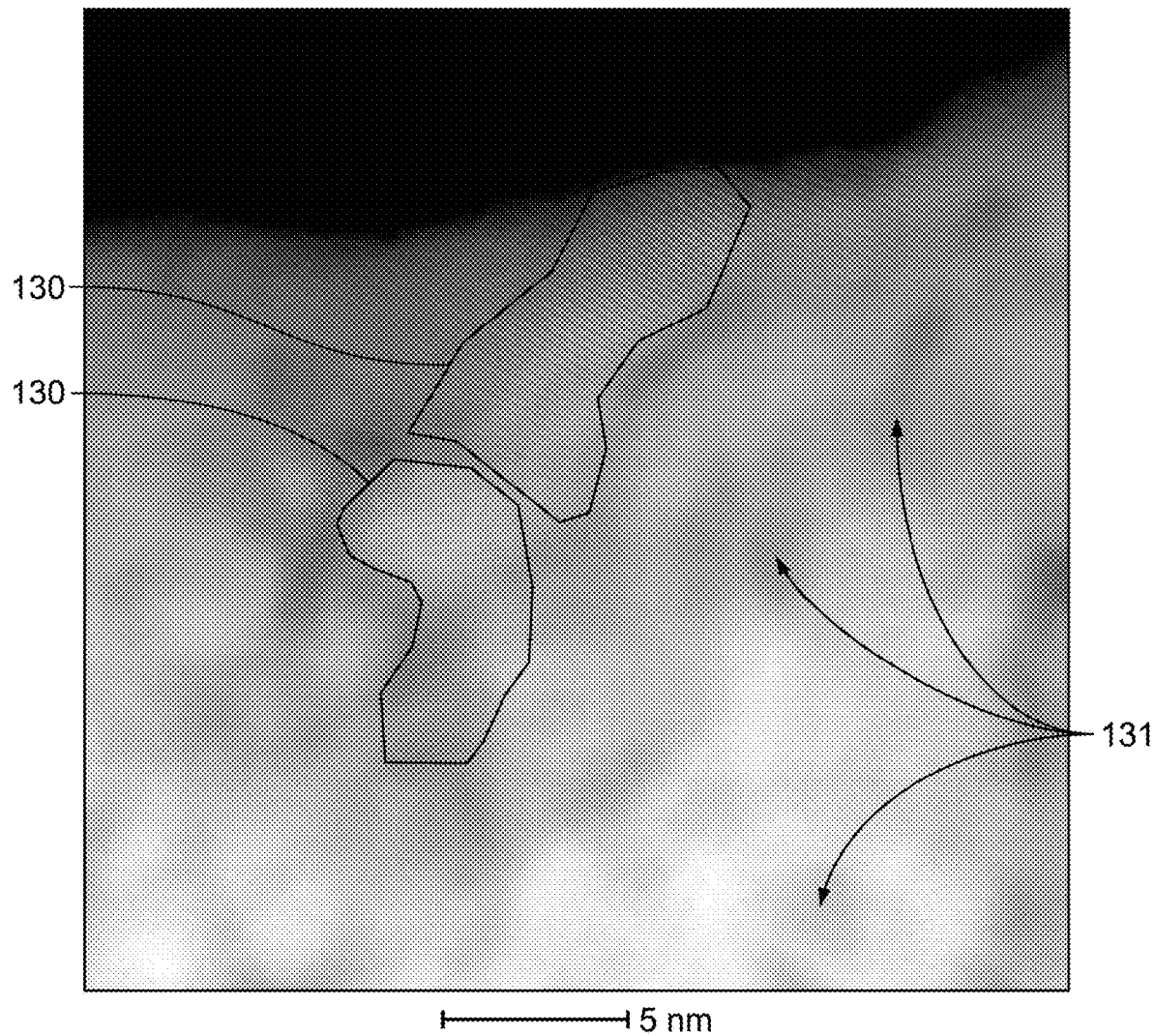

FIG. 13 is a high-resolution HAADF image showing a portion of the preceding figure at still greater magnification. Outlines 130 of platinum-gold nanocrystals are superimposed on the image, and several nanoscale voids 131 are labeled.

Figure 14:
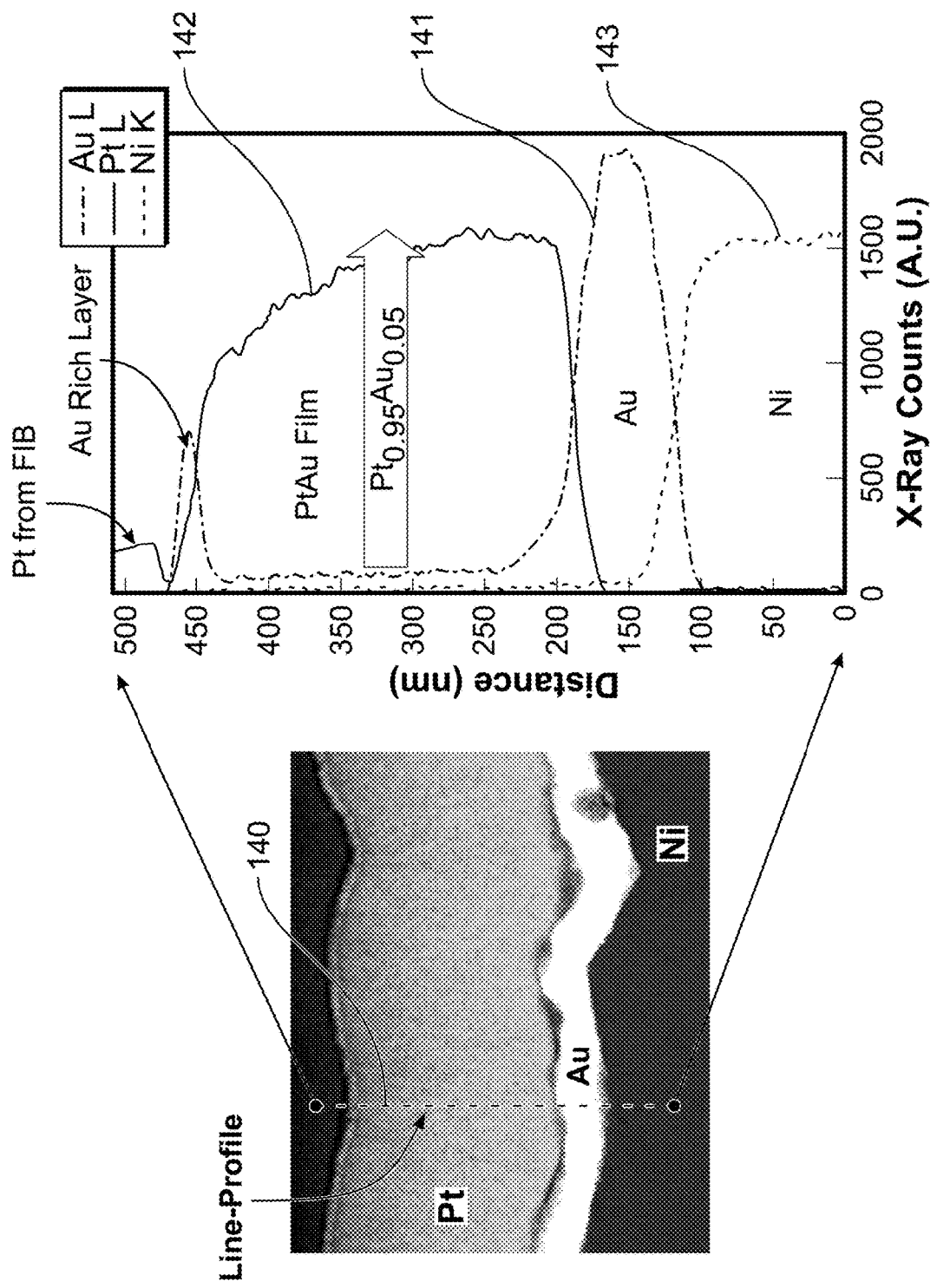
FIG. 14 is an energy dispersive x-ray spectroscopic (EDS) map of the sample of the preceding figures, taken along the line profile indicated in an overlay on the color-enhanced HAADF image shown at left.

We performed a spatially dependent compositional analysis of the sample by energy dispersive x-ray spectroscopic (EDS) mapping. FIG. 14 shows, at right, an EDS map of the sample of the preceding figures, taken along the line profile 140 indicated in an overlay on the HAADF image shown at left. The EDS map includes traces 141, 142, and 143 for the gold L line, the platinum L line, and the nickel K line, respectively. The EDS analysis indicates that the major portion of the Pt—Au film has the approximate composition Pt0.95Au0.05. A thin, gold-rich layer is seen near the top surface of the film, and another gold-rich layer is seen near the gold strike layer.

Example 3

A Pt—Au alloy film, prepared substantially as described above, was subjected to structural analysis by selected area electron diffraction (SAED). The electron diffraction pattern was consistent with the presence of a uniform alloy.

Figure 15:
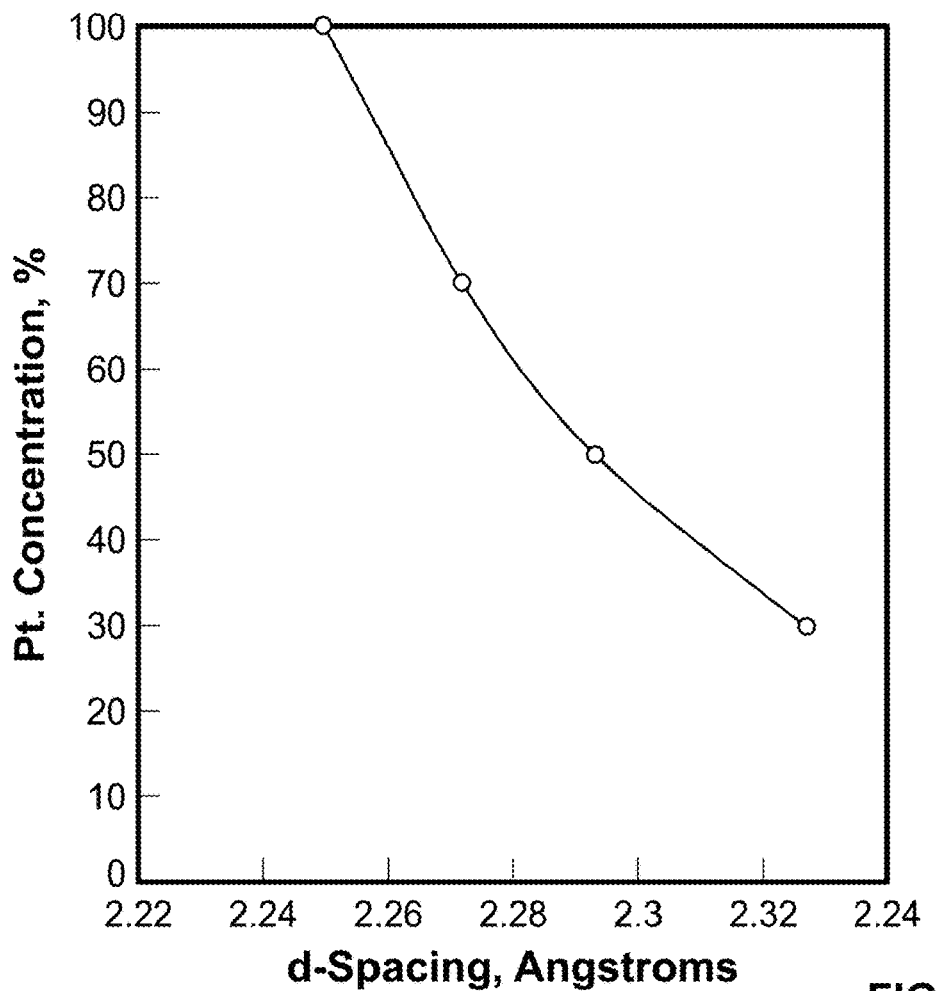
FIG. 15 is a graph of the platinum atomic fraction in Pt—Au alloys as a function of the d-spacing, based on a published tabulation.

We measured d-spacings from the diffraction pattern and used them to infer the composition of the alloy. FIG. 15 is a graph of the platinum atomic fraction in Pt—Au alloys as a function of the d-spacing, based on a tabulation in S. Moniri et al., "Pitfalls and best practices in measurements of the electrochemical surface area of platinum-based nanostructured electro-catalysts," J. Catalysis 345 (2017) 1-10.

Based on linear interpolation, we inferred a platinum atomic fraction of 87.7%. For comparison, SAED analysis of a platinum sample yielded a platinum fraction of 102.7%.

After a wear test of the kind described above with 10,000 cycles at 1 N normal force, we detected a gold-rich phase with a platinum atomic fraction of 45.5%. Interpretation of this result is complicated because of the limited area that was examined and because of the possibility that several phases (for example, a platinum phase, a gold phase, and the alloy phase) are jointly contributing to the diffraction pattern.

Example 4

A Pt—Au alloy film, prepared substantially as described above, was subjected to structural analysis by high-resolution transmission electron microscopy (HRTEM). We observed a granular structure in which nanograins of Pt—Au alloy were roughly ellipsoidal in shape, with dimensions generally in the range 5-10 nm. The majority of the grains had a major axis less than 10 nm and an aspect ratio less than about 2. In this regard, the major axis and the aspect ratio are defined in terms of a minimal ellipsoid circumscribed about the grain.

The film was also observed to contain nanopores with dimensions generally in the range 1-2 nm. The density, and/or the size, of the nanopores appeared to increase with distance from the substrate.

We also observed gold enrichment at the surface of the film.

Example 5

The sample film of Example 1 was subjected to EDS mapping for compositional analysis at a location separated from the wear track where friction and wear were evaluated. The middle portion of the film was determined to have an approximate composition Pt0.95Au0.05, with the largest variation near the top surface where there was a gold-rich layer, and near the interface with the underlying gold strike layer.

As those skilled in the art will understand, inconsistencies between SAED estimates and EDS estimates of the film composition should be expected, not least because the SAED results are sensitive to the locations on the film where they were taken and because they may come from the convolved diffraction patterns of multiple phases.

Figure 16:
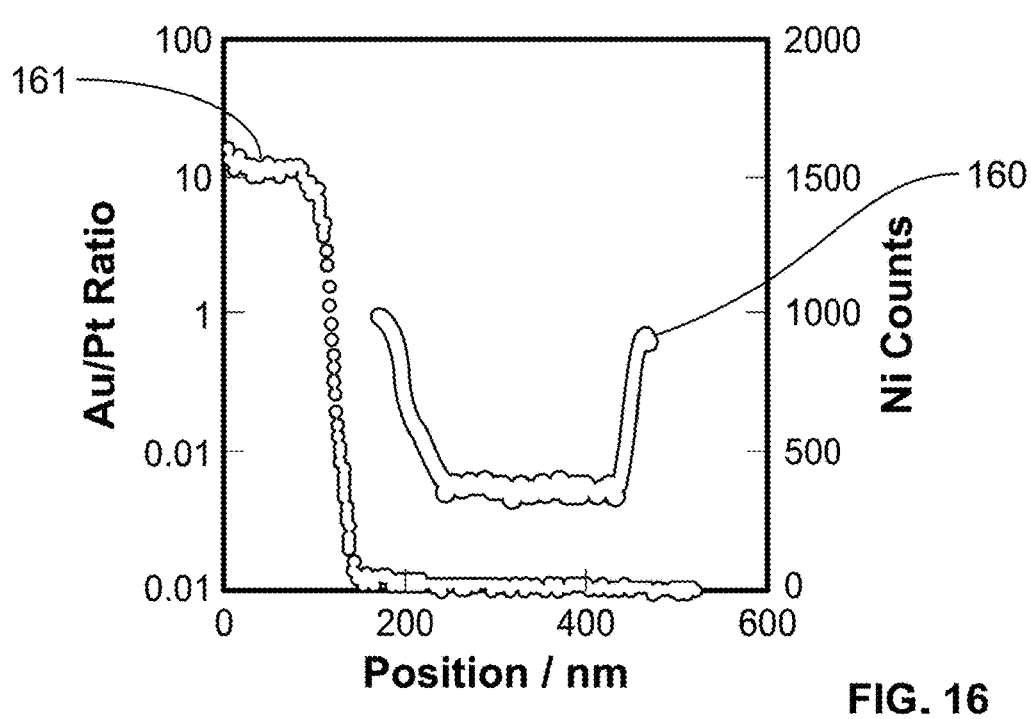
FIG. 16 is a graph of experimental data showing the gold-to-platinum atomic ratio (left-hand scale) as a function of position in an example film. The data plotted against the right-hand scale show the distribution of nickel in the sample.

FIG. 16 is a graph of experimental data showing a plot 160 of the gold-to-platinum atomic ratio (left-hand scale) as a function of position in the film. The data 161 plotted against the right-hand scale show the distribution of nickel in the sample.

Based on our observations by scanning electron diffraction (SED) and imaging, we believe that most likely, the grains in our samples have an alloy composition, and not a composition that is a mixture of distinct phases. However, phase segregation within the grains is not definitively ruled out.

Iridium-Platinum Alloy Films

We used electrodeposition methods similar to those described above to deposit binary alloy films of iridium and platinum. Unlike the PtAu films, in which the major constituent was platinum, our IrPt films had a platinum composition that was less than about 50 at. %.

From structural evaluation by x-ray diffraction, we concluded that the product was most likely composed of a single-phase alloy, and not of segregated phases of different compositions. We evaluated four films, and found sample-dependent grain sizes that were less than 20 nm and in one or more cases, less than 10 nm.

From elemental analysis by x-ray fluorescence, we determined an iridium concentration in the range 55%-90%, depending on which sample was evaluated and what deposition conditions were used for that sample.

We claim:

1. An article comprising a film of platinum-gold alloy coated onto a substrate, wherein:
   the alloy is composed of more than 50 atomic percent platinum;
   the alloy has a microstructure composed of generally ellipsoidal grains; and
   more than half of the generally ellipsoidal grains have a major axis of 10 nm or less.

2. The article of claim 1, wherein the more than half of the generally ellipsoidal grains have a major axis in the range 5-10 nm.

3. The article of claim 1, wherein the more than half of the generally ellipsoidal grains have a major axis in the range 5-10 nm and an aspect ratio in the range 1.0-2.5, the aspect ratio being defined such that a sphere has an aspect ratio of 1.0 and greater values of the aspect ratio correspond to shapes that are more prolate.

4. The article of claim 1, wherein the microstructure of the alloy encompasses a plurality of nanopores, and wherein more than half of the nanopores have maximum dimensions in the range 1-2.5 nm.

5. The article of claim 1, wherein the alloy has a gold content in the range 5-20 atomic percent.

6. The article of claim 1, wherein the alloy is a binary alloy of platinum and gold.

7. The article of claim 1, wherein the film has a thickness in the range 10 nm to 100 µm.

8. The article of claim 1, wherein the film has a thickness in the range 5-100 µm.

9. The article of claim 1, wherein the more than half of the generally ellipsoidal grains are composed of a uniform gold-to-platinum atomic ratio.

10. The article of claim 1, wherein the film has a gold-to-platinum atomic ratio that varies with depth within the film.

11. The article of claim 1, wherein the film has a gold-to-platinum atomic ratio that varies with depth within the film such that a substantially linear compositional gradient is defined within the film.

12. The article of claim 1, wherein the alloy contains at most 10 atomic percent of alloyed metallic elements other than platinum and gold.

13. The article of claim 1, wherein the alloy contains at most 5 atomic percent of alloyed metallic elements other than platinum and gold.

14. The article of claim 1, wherein the film is electrodeposited from an acidic electroplating bath.

15. The article of claim 1, wherein the film exhibits less than $3 \times 10^{-7}$ mm$^3$/N-m of wear in a reciprocating linear ball-on-flat friction and wear test.

16. The article of claim 1, wherein the film exhibits a coefficient of friction of about 0.2 or less in a reciprocating linear ball-on-flat friction and wear test.

17. The article of claim 1, wherein the microstructure of the alloy encompasses a plurality of nanopores, and the nanopores have a volume fraction in the film falling in the range 1% to 10%.

18. The article of claim 1, wherein the microstructure of the alloy encompasses a plurality of nanopores, the nanopores have a volume fraction in the film falling in the range 1% to 10%, and more than half of the nanopores have maximum dimensions in the range 1-2.5 nm.

19. An article comprising a film of amorphous platinum-gold alloy coated onto a substrate, wherein the alloy is composed of more than 50 atomic percent platinum.

20. An article comprising a film of platinum-gold alloy coated onto a substrate, wherein:
   the alloy is composed of more than 50 atomic percent platinum;
   the alloy has a microstructure composed of generally ellipsoidal grains; and
   more than half of the generally ellipsoidal grains have a major axis of 3 nm or less.

* * * * *